United States Patent
Doshi

(10) Patent No.: US 10,303,477 B2
(45) Date of Patent: May 28, 2019

(54) PERSISTENT COMMIT PROCESSORS, METHODS, SYSTEMS, AND INSTRUCTIONS

(71) Applicant: INTEL CORPORATION, Santa Clara, CA (US)

(72) Inventor: Kshitij A. Doshi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 14/751,892

(22) Filed: Jun. 26, 2015

(65) Prior Publication Data
US 2016/0378467 A1 Dec. 29, 2016

(51) Int. Cl.
*G06F 9/30* (2018.01)
*G06F 12/0875* (2016.01)
*G06F 11/14* (2006.01)
*G06F 11/00* (2006.01)

(52) U.S. Cl.
CPC ........ *G06F 9/3016* (2013.01); *G06F 9/30098* (2013.01); *G06F 11/00* (2013.01); *G06F 11/1407* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| 2006/0294326 A1* | 12/2006 | Jacobson | G06F 9/30087 711/156 |
| 2013/0326150 A1 | 12/2013 | Phelan et al. | |
| 2014/0136786 A1* | 5/2014 | Carpenter | G06F 9/466 711/125 |
| 2014/0297595 A1* | 10/2014 | Larson | G06F 11/1471 707/648 |

(Continued)

FOREIGN PATENT DOCUMENTS

CN 104050023 A 9/2014

OTHER PUBLICATIONS

Extended European Search report received for European Patent Application No. 16171194.0, dated Nov. 17, 2016, 8 pages.
Office Action received for Japanese Patent Application No. 2016-094195, dated Jun. 27, 2017, 7 pages of Japanese Office Action including 4 pages of English Translation.

(Continued)

*Primary Examiner* — William B Partridge
(74) *Attorney, Agent, or Firm* — Nicholson De Vos Webster & Elliott LLP

(57) ABSTRACT

A processor includes at least one memory controller, and a decode unit to decode a persistent commit demarcate instruction. The persistent commit demarcate instruction is to indicate a destination storage location. The processor also includes an execution unit coupled with the decode unit and the at least one memory controller. The execution unit, in response to the persistent commit demarcate instruction, is to store a demarcation value in the destination storage (Continued)

location. The demarcation value may demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed.

27 Claims, 17 Drawing Sheets

(56) References Cited

U.S. PATENT DOCUMENTS

| | | | |
|---|---|---|---|
| 2015/0006834 A1* | 1/2015 | Dulloor | G06F 3/0604 |
| | | | 711/162 |
| 2015/0052336 A1 | 2/2015 | Greiner et al. | |
| 2016/0092223 A1 | 3/2016 | Wang et al. | |
| 2016/0246723 A1 | 8/2016 | Doshi et al. | |

OTHER PUBLICATIONS

Office Action received for Korean Patent Application No. 10-2016-0062738, dated Jul. 19, 2017, 18 pages of Korean Office Action including 9 pages of English Translation.
Intel, "Intel Architecture Instruction Set Extensions Programming Reference", 319433-022, Oct. 2014, 32 pages.
Notice of Allowance received for European Patent Application No. 16171194.0, dated Oct. 9, 2017, 5 pages.
Response for European Patent Application No. 16171194.0 filed on Jun. 28, 2017 to Extended European Search Report dated Nov. 17, 2016, 31 pages.
Office Action received for Japanese Patent Application No. 2016-094195, dated Feb. 27, 2018, 7 pages of Japanese Office Action including 4 pages of English Translation.
Response for Japanese Patent Application No. 2016-094195 filed on Sep. 27, 2017 to Office Action dated Jun. 27, 2017, 24 pages of Japanese Response including 13 pages of English Translation.
Office Action received for Chinese Patent Application No. 201610355929.5, dated Mar. 5, 2018, 12 pages of Chinese Office Action only.

* cited by examiner

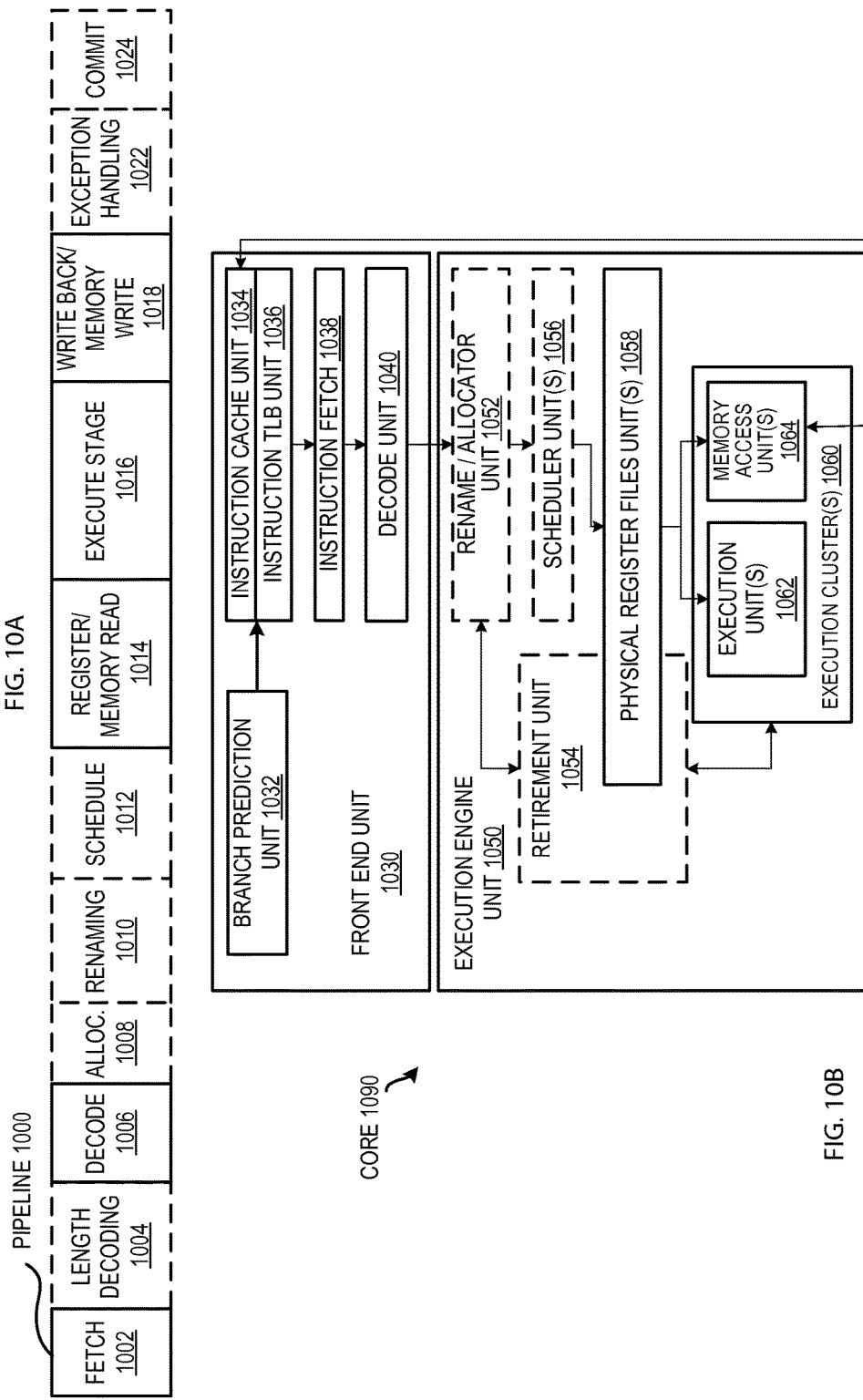
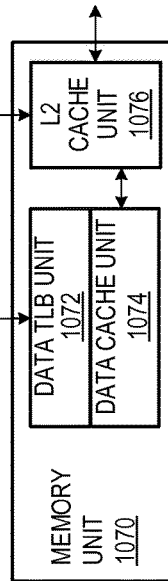

PERSISTENT COMMIT PROCESSORS, METHODS, SYSTEMS, AND INSTRUCTIONS

BACKGROUND

Technical Field

Embodiments described herein generally relate to processors. In particular, embodiments described herein generally relate to store operations in processors.

Background Information

Processors are often used computer systems and other electronic devices that have a main memory to store data. The processors may execute instructions to access data in the main memory. For example, processors may execute load instructions to load or read data from the main memory and/or store instructions to write or otherwise store data to the main memory.

One challenge in computer systems and other electronic devices is that power failures, system crashes, and other errors can occur. Often, such errors result in data associated with store instructions being lost.

BRIEF DESCRIPTION OF THE DRAWINGS

The invention may best be understood by referring to the following description and accompanying drawings that are used to illustrate embodiments. In the drawings:

FIG. 10A is a block diagram illustrating an embodiment of an in-order pipeline and an embodiment of a register renaming out-of-order issue/execution pipeline.

FIG. 10B is a block diagram of an embodiment of a processor core including a front end unit coupled to an execution engine unit and both coupled to a memory unit.

DETAILED DESCRIPTION OF EMBODIMENTS

Disclosed herein are instructions, processors to execute the instructions, methods performed by the processors when processing or executing the instructions, and systems incorporating one or more processors to process or execute the instructions. In the following description, numerous specific details are set forth (e.g., specific instruction operations, combinations of instructions, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
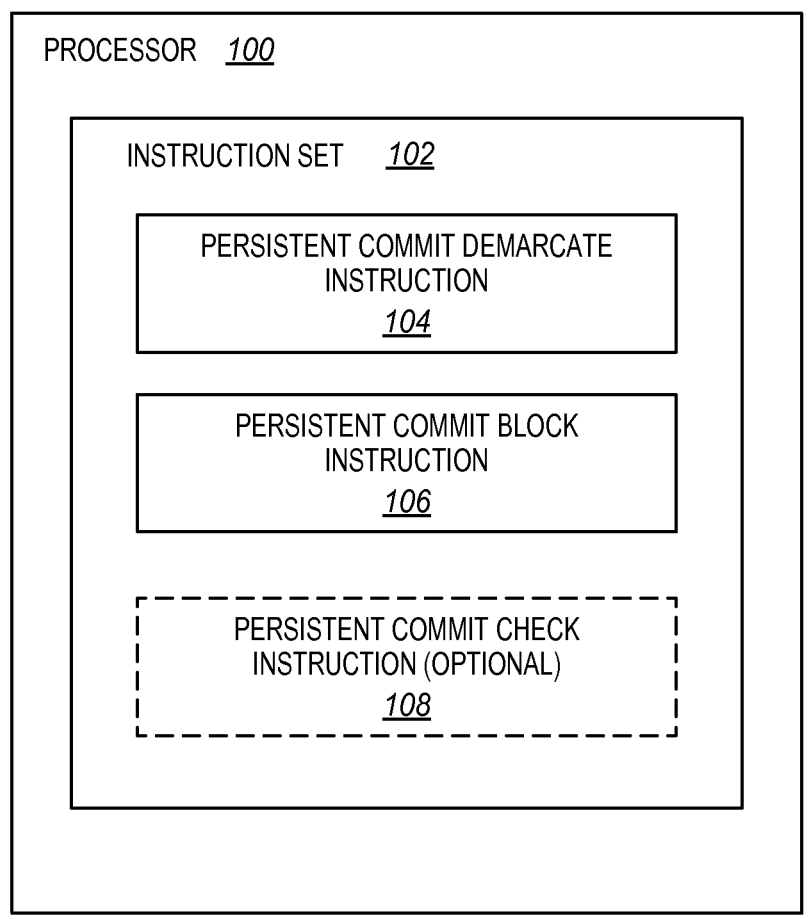
FIG. 1 is a block diagram of an embodiment of a processor having an instruction set with embodiments of persistent commit instructions.

FIG. 1 is a block diagram of an embodiment of a processor 100. The processor has an instruction set 102. The instruction set includes the set of instructions that the processor is operative to perform. The instructions of the instruction set represent macroinstructions, or machine-level instructions that are provided to the processor for execution, as opposed to microinstructions, micro-ops, or other decoded instructions that result from the instructions of the instruction set being decoded.

As shown, in some embodiments, the instruction set may include a persistent commit demarcate instruction 104. The persistent commit demarcate instruction may indicate a destination register or other destination storage location. In some embodiments, the persistent commit demarcate instruction if performed may be operative to cause the processor to store a demarcation value that demarcates or distinguishes at least all store to persistent memory operations that are to have been accepted to memory when the persistent commit demarcate instruction is performed, but which are not necessarily to have been stored persistently, from at least all store to persistent memory operations that are not yet to have been performed by at least one or more processors or accepted to memory when the persistent commit demarcate instruction is performed.

As shown, in some embodiments, the instruction set may include a persistent commit block instruction 106. The persistent commit block instruction may indicate a register or other source storage location that is to store a demarcation value of a preceding persistent commit demarcate instruction. In some embodiments, the persistent commit block instruction if performed may be operative to cause the processor to ensure that at least all store to persistent memory operations demarcated by the demarcation value (e.g., that are to have been accepted to memory when the preceding corresponding persistent commit demarcate instruction was performed, but which are not necessarily to have been stored persistently when the preceding corresponding persistent commit demarcate instruction was performed) have been stored persistently, before at least any store to persistent memory instructions are executed after execution of the persistent commit block instruction.

As shown, in some embodiments, the instruction set may optionally include a persistent commit check instruction 108, although this is not required. In some embodiments, the persistent commit check instruction may indicate a destination storage location. In some embodiments, the persistent commit check instruction if performed may be operative to cause the processor to store a value in the destination storage location. In some embodiments, the value may be indicative of whether at least all store to persistent memory operations demarcated by a preceding persistent commit demarcate instruction (e.g., store to persistent memory operations that are to have been accepted to memory when the preceding corresponding persistent commit demarcate instruction was performed, but which are not necessarily to have been stored persistently when the preceding corresponding persistent commit demarcate instruction was performed) have now been stored persistently. In some embodiments, the value stored may be indicative of a level of progress of persistently storing all of these demarcated store to persistent memory operations. In some embodiments, such a value or status need not necessarily apply to the most recent demarcation value, but rather may be applicable to various prior demarcation values. In other embodiments, the instruction may optionally have a source register or operand to provide a particular demarcation value to which the value or status stored in the destination will apply.

In other embodiments, the instruction set may optionally include a subset of the illustrated instructions (e.g., as few as any single one of these instructions). In still other embodiments, the instruction set may optionally include other instructions or entirely different instructions (e.g., the instructions discussed below in conjunction with FIG. 9).

Figure 2:
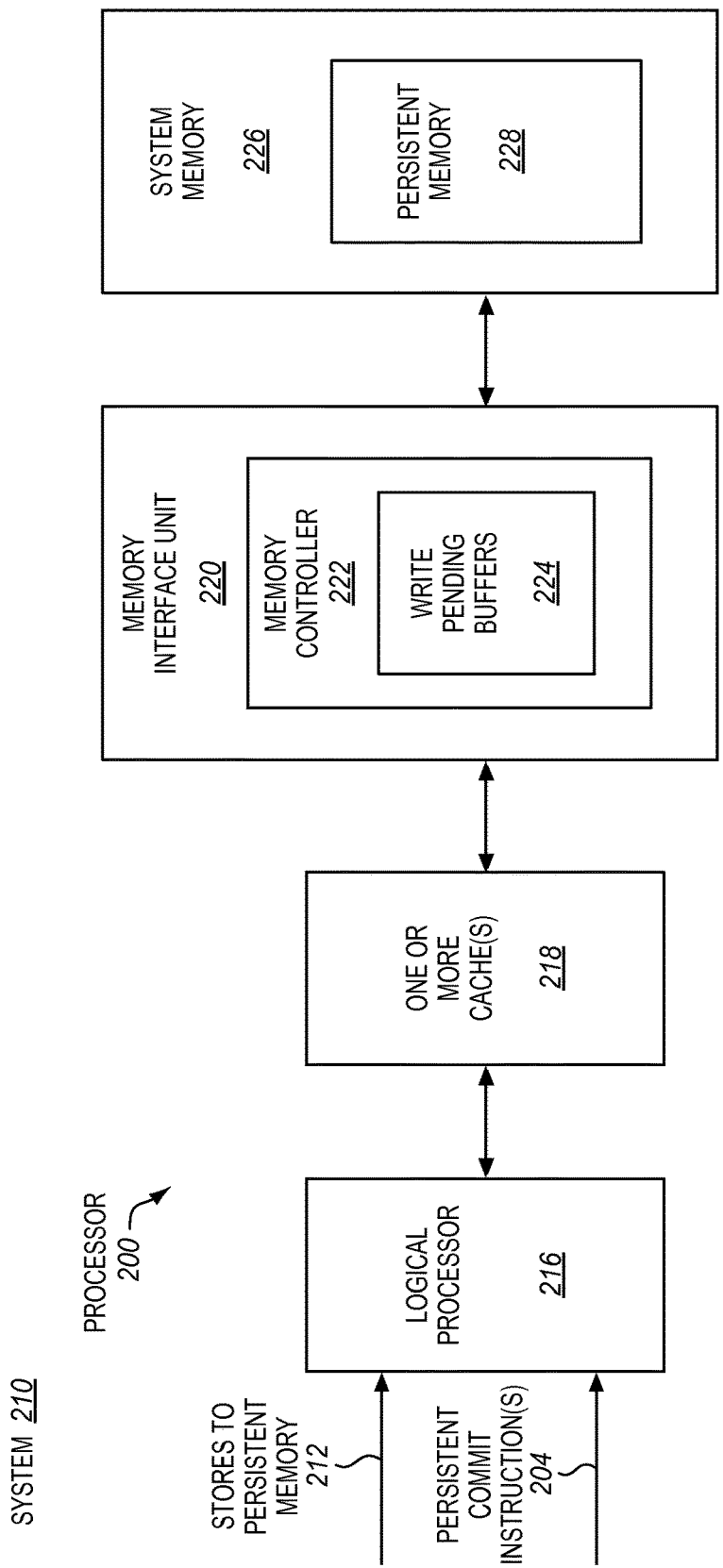
FIG. 2 is a block diagram of an embodiment of a system in which embodiments of the invention may be implemented.

FIG. 2 is a block diagram of an embodiment of a system 210 in which embodiments of the invention may be implemented. The system includes a processor 200 and a system memory 226 coupled with the processor. In various embodiments, the system may represent a desktop computer, a laptop computer, a notebook computer, a tablet computer, a netbook, a smartphone, a cellular phone, a server, a network device (e.g., a router, switch, etc.), a smart television, a nettop, a set-top box, a video game controller, a media player, or other type of electronic device.

The processor includes at least one logical processor 216. For simplicity, only a single logical processor is shown, although it is to be appreciated that the processor may optionally include other logical processors. Examples of suitable logical processors include, but are not limited to, cores, hardware threads, thread units, thread slots, and other logical processors. Each of the logical processors may include an instruction execution pipeline to process instructions (e.g., store instructions, arithmetic instructions, logical instructions, etc.). By way of example, each pipeline may include an instruction fetch unit to fetch instructions, an instruction decode unit to decode instructions, execution units to execute the instructions, and other pipeline components. The scope of the invention is not limited to any known type of pipeline.

The logical processor is coupled with one or more caches 218. In some embodiments, the one or more caches may include a cache hierarchy that includes caches at different cache levels. The different cache levels may differ in their relative closeness to the logical processor and/or the system memory. As one illustrative example, the logical processor may have a dedicated first level or level 1 (L1) cache, and a shared second level or level 2 (L2) cache. As another illustrative example, the logical processor may have a dedicated L1 cache and a dedicated L2 cache, and a shared third level or level 3 (L3) cache. The scope of the invention is not limited to any known type of cache hierarchy. Moreover, in other embodiments, the processor may have a single cache level instead of a cache hierarchy.

The one or more caches 218 may be used to store instructions and/or data as desired for the particular implementation. The caches may represent relatively smaller and faster-access storage than the system memory 226. In addition, the caches may be relatively closer to the instruction pipelines than the system memory. The caches may be used to cache or temporarily store data that has been brought into the processor from the system memory in order to provide faster subsequent accesses to the data. Representatively, accesses to data in the caches generally take no more than a few processor clock cycles, whereas accesses to data in the system memory may often take many more cycles. When the processor wants to read data from the system memory, the processor may first check to see if a copy of the data is already stored in the caches. If the data is found in the caches, then the processor may access the data from the caches, which is generally faster than if the data were instead accessed from the system memory. Similarly, when the processor wants to write data to the system memory, the data may often first be stored in the caches.

The processor may implement a cache coherency mechanism or protocol to help ensure that data stored in the one or more caches 218 is coherently managed and stored to the system memory 226 at appropriate times so that all pertinent entities in the system coherently view correct and current versions of the data. Examples of suitable cache coherency protocols include, but are not limited to, MESI, MOSI, MOESI, and the like. The MESI protocol includes four states, namely modified (M), exclusive (E), shared (S), and invalid (I), which are indicated by two MESI bits. The MOSI protocol utilizes the owned (O) state in place of the exclusive (E) state. The MOESI protocol utilizes both the exclusive (E) and owned (O) states. Such cache coherency protocols do not take into account persistency or durability of data, which will be discussed further below.

Referring again to FIG. 2, the processor has a memory interface unit 220 that includes a memory controller 222. In some embodiments, the system may include only a single memory controller. In other embodiments, the system may include two or more memory controllers. For simplicity, only a single memory controller is shown in the illustration. In this embodiment, the memory controller is located on the processor (e.g., is an on-die memory controller). In another embodiment, the memory controller may optionally be located off of the processor (e.g., be an off-die memory controller in a chip set component). The memory interface unit and/or the memory controller may be operative to be coupled with the system memory 226. For example, the coupling may be over one or more buses or other interconnects. The memory controller has write pending buffers to temporarily buffer data being stored or written to the system memory.

In some embodiments, the system memory 226 may include at least some persistent memory 228. The persistent memory may be operative to store data persistently or durably. The persistently or durably stored data may not be lost even in the event of a power loss, operating system failure, system crash, system reboot, and the like. Examples of suitable forms of persistent memory include, but are not limited to, non-volatile memory and storage, battery-backed (or other power-source backed) volatile memory and storage, and the like, and combinations thereof. Typically, volatile memory loses its stored data or contents when power is not supplied for a relatively short period of time. However, backing the volatile memory with a battery or other backup power source may help to make the volatile memory be persistent memory. Non-volatile memories and storage devices are natively operative to retain their stored data or contents even after relatively long periods with no power applied (e.g., typically for at least a week without power).

Specific examples of suitable types of memory and/or storage for the persistent memory 228 include, but are not limited to, battery-backed (or other power-source backed) dynamic random access memory (DRAM) and other forms of RAM, non-volatile memory or storage based on phase change memory (PCM), memristors (e.g., non-linear passive two-terminal electrical components relating electric charge and magnetic flux linkage), and spin-transfer torque (e.g., that utilize an effect in which the orientation of a magnetic layer in a magnetic tunnel junction or spin valve can be modified using a spin-polarized current), and combinations thereof, to name just a few examples. Other technologies developed in the future, which are either extensions or improvements of these technologies, or different technologies entirely, are also potentially suitable. Also, other forms of non-volatile memory commonly used as secondary backing memory in computer systems, are also potentially suitable. Examples include, but are not limited to, hard disks, magnetic tape, other types of magnetic storage devices, various types of read-only memory (ROM), optical discs, ferroelectric RAM (F-RAM), and magnetoresistive RAM. Commonly, such forms of memory have speed or other characteristics that favor the aforementioned types of memory, although the scope of the invention is not limited in this respect. The scope of the invention is not limited to any particular type of persistent memory.

In some embodiments, the system memory 226 may consist of only the persistent memory 228. In other embodiments, the system memory may include both the persistent memory as well as non-persistent memory (e.g., DRAM or other types of memory conventionally used for main or primary memory). In some embodiments, the persistent memory may be part of the processors addressable physical address space. Software may be able to access the persistent memory by performing load instructions, store instructions, and other instructions of an instruction set of the processor. In some embodiments, the persistent memory may be byte-addressable, as opposed to only being page/block addressable. In some embodiments, the persistent memory may be directly coupled with the processor memory bus. In some embodiments, accesses to the persistent memory may be subject to much the same processor memory model (e.g., with respect to cacheability, coherency, processor memory ordering, memory types, etc.) as accesses to conventional main/primary memory (e.g., DRAM).

An ability to store data persistently or durably in the persistent memory 228 may be very valuable for certain applications and/or implementations. For example, in certain database applications and/or data transactions it is very important not to lose data. However, ensuring that data is stored persistently or durably in the persistent memory 228 may tend to pose additional challenges to software. For one thing, the processor may have various intermediate volatile microarchitectural components and/or storage in which data associated with store or write types of instructions may be temporarily stored in on its way to the persistent memory. Possible examples of such volatile components and/or storage include, but are not limited to, the one or more caches 218, queues or buffers (e.g., the write pending buffers 224) in the memory controllers 222, uncore and/or interconnect queues or buffers, memory-side caches, and the like. Such volatile components or storage are generally not able to retain their data or contents in the event of a power failure, operating system failure, system crash, reboot, or the like. The data being stored toward the persistent memory may not actually become persistent or durable until it actually reaches and is stored in the persistent memory (or in an intermediate power-fail protected storage device or buffer). As used herein, storing data to the persistent memory encompasses storing the data in such an intermediate power-fail protected storage device or buffer, which is also persistent or durable. As a result, if a power failure, system crash, operating system failure, or reboot occurs while the data is stored in such volatile components or storage (e.g., in the write pending buffers 224 in the memory controller 222), the data will typically be lost, without the desired persistency or durability having been achieved.

As shown, in some embodiments, the logical processor may be operative to perform one or more persistent commit instructions 204 as disclosed herein. In some embodiments, these persistent commit instruction(s) may be used to help measure and control an order in which stores to persistent memory 212 (e.g., store instructions indicating address ranges corresponding to the persistent memory 228) are committed to the persistent memory and/or stored persistently.

Figure 3:
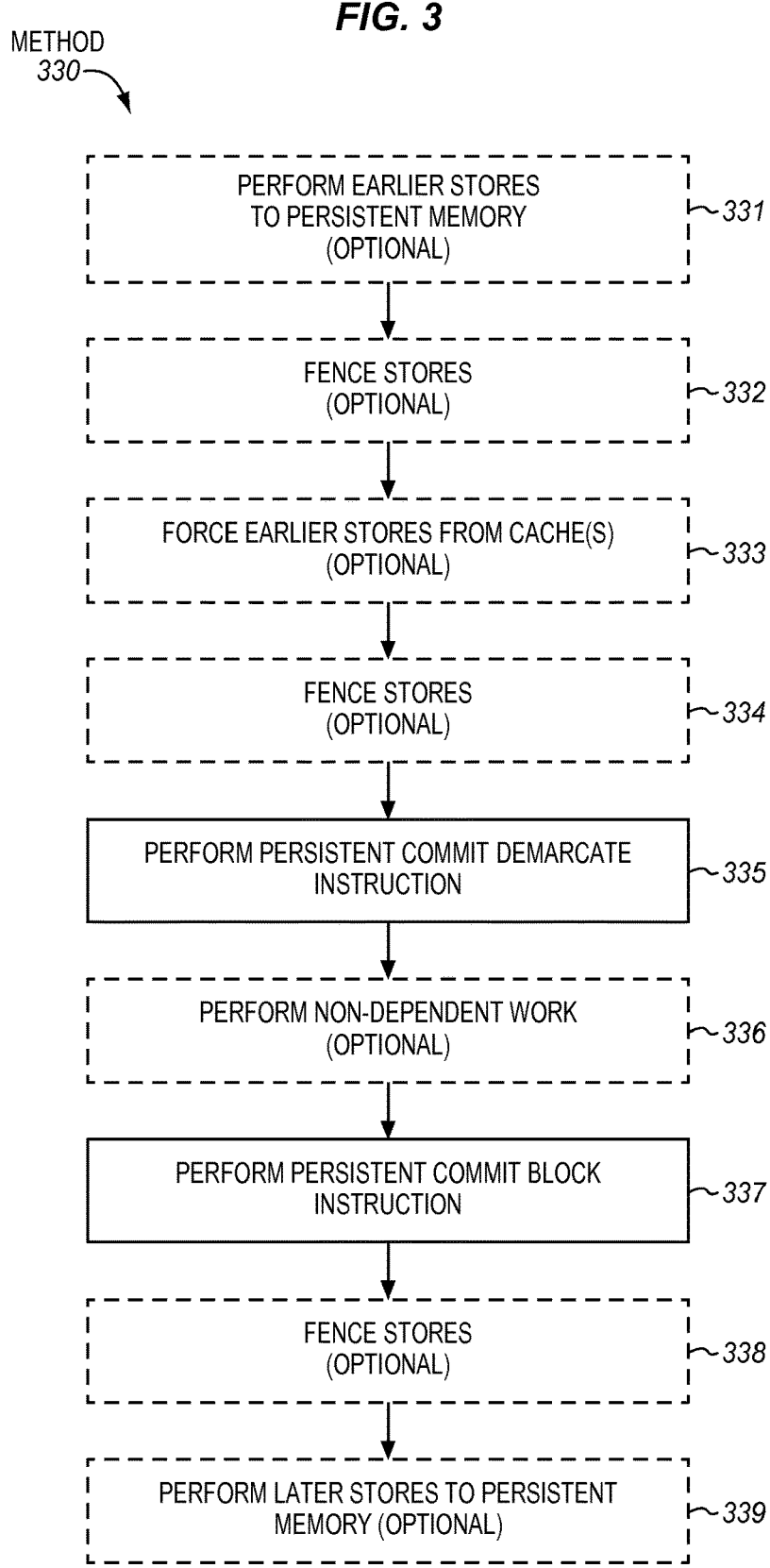
FIG. 3 is a block flow diagram of one possible example of a method in which an embodiment of a persistent commit demarcate instruction and a persistent commit block instruction may be used.

FIG. 3 is a block flow diagram of one possible example of a method 330 performed with a processor in which an embodiment of a persistent commit demarcate instruction and a persistent commit block instruction may be used. In this illustration, to further illustrate an example context in which the persistent commit demarcate and persistent commit block instructions may be used, several optional blocks are shown in dashes. The operations of these dashed boxes are optional not required.

At block 331, one or more earlier store to persistent memory instructions may optionally be performed. For example, these instructions may each indicate an address range corresponding to the persistent memory (e.g., persistent memory 228). As previously mentioned, the data of such stores may not immediately be stored in the persistent memory or committed to persistence, but rather may first be cached in one or more volatile processor caches (e.g., the one or more caches 218), and then in some cases may subsequently be temporarily stored in a memory interface unit (e.g., stored in the write pending buffers 224 of the memory controller 222).

At block 332, stores may optionally be fenced. For example, this may include performing a store fence instruction that is operative to cause the processor guarantee that all older stores (e.g., which precede the store fence instruction in original program order) become globally visible before all younger stores (e.g., which follow the store fence instruction in the original program order).

At block 333, the earlier stores to the persistent memory (e.g., the stores performed at block 331) may optionally be flushed or otherwise forced from any volatile coherency caches (e.g., the one or more caches 218). For example, this may include performing a CLFLUSH or CLFLUSHOPT or CLWB instruction in certain Intel® Architecture compatible processors. While this may ensure that the data is forced from the volatile caches, it generally does not ensure that the data is actually stored to the persistent memory. For example, CLFLUSH and CLFLUSHOPT or CLWB may complete when the data forced from the caches is accepted to memory, for example, pushed into or posted to the memory interface unit (e.g., stored in the write pending buffers 224 in the memory controller 222). However, such data would not actually become persistent until it is stored in the persistent memory (e.g., is actually stored in the persistent memory, or is stored in an intermediate power-failure protected buffer which as used herein is considered part of the persistent memory).

At block 334, stores may again optionally be fenced. Such a fence may or may not be needed depending upon the particular implementation (e.g. depending in part on the memory ordering model and how instructions are ordered relative to one another).

At block 335, an embodiment of a persistent commit demarcate instruction may be performed. In some embodiments, the persistent commit demarcate instruction when performed may be operative to cause the processor to store a demarcation value in a destination storage location indicated by the persistent commit demarcate instruction. In some embodiments, the demarcation value may demarcate at least all store to persistent memory operations that are to have been accepted to memory when the persistent commit demarcate instruction is performed, but which are not necessarily to have been stored persistently (e.g., have not necessarily exited at least one memory controller), from at least all store to persistent memory operations that are not yet to have been accepted to memory when the persistent commit demarcate instruction is performed. For example, in some embodiments, the demarcation value may demarcate at least all store to persistent memory operations that are to have been received at one or more memory controllers at times before the persistent commit demarcate instruction is performed (e.g., potentially some of the stores performed at block 331 which were flushed from the caches at block 333) from at least all second store to persistent memory operations that are to be received at the one or more memory controllers at times after the persistent commit demarcate instruction is performed (e.g., the stores that will be performed at block 339).

As will be explained further below, in some embodiments, the demarcation value may represent a monotonically increasing value (e.g., an arrival counter value of an arrival counter of a memory controller, an arrival time value of an arrival clock or other timer of a memory controller), or other delimitation, delineation, dividing line, or other indication that is operative to distinguish and/or set apart and/or differentiate at least all store to persistent memory operations that are to have been accepted to memory when the persistent commit demarcate instruction is performed, but which are not necessarily to have been stored persistently (e.g., which could potentially still be in the write pending buffers 224), from at least all store to persistent memory operations that are not yet to have been accepted to memory when the persistent commit demarcate instruction is performed.

Store to memory operations may be accepted to memory in various different ways in different embodiments. In some embodiments, the store operations may be accepted to memory if they are stored in write pending buffers (e.g., write pending buffers 224) or otherwise stored in a memory controller and/or memory interface unit. In some embodiments, the store operations may be accepted to memory if they are non-temporal stores to write back memory or are stores to uncacheable, write-combining, and write-through, memory, which become globally visible. In some embodiments, the preceding store operations may be accepted to memory if a cache line flush instruction (e.g., a CLFLUSH, CLFLUSHOPT, or CLWB instruction), which is performed for a cache line as a preceding store to write-back memory, becomes globally visible.

At block 336, non-dependent work may optionally be performed after the persistent commit demarcate instruction is performed at block 335 and before the persistent commit block instruction is performed at block 337. The term "non-dependent" work refers to work, code, or any set of instructions that can be performed that do not include instructions that depend on the stores to which the persistent commit demarcate instruction and/or the demarcation value apply. For example, the non-dependent work may include only instructions that access different memory locations than all stores that have been accepted to memory when the persistent commit demarcate instruction was performed. Conceptually, the software may perform any work that it knows it can do without causing erroneous or incorrect modifications of state, including work whose effects software knows it can mark as tentative or speculative until later confirmed by a completing action from software.

At block 337, an embodiment of a persistent commit block instruction may be performed. In some embodiments, the persistent commit block instruction may indicate a source storage location which may have a value that may be or at least equal the demarcation value obtained or stored by the persistent commit demarcate instruction. In some embodiments, the persistent commit block instruction when performed may be operative to cause the processor to ensure that at least all store to persistent memory operations demarcated by the demarcation value (e.g., which have not necessarily exited or departed the write pending buffers 224 of one or more memory controllers) have been stored persistently, before at least any store to persistent memory instructions are executed after execution of the persistent commit block instruction. For example, the persistent commit block instruction when performed may be operative to cause the processor to ensure that at least all store to persistent memory operations that are to have been accepted to memory when the preceding corresponding persistent commit demarcate instruction was performed, but which are not necessarily to have been stored persistently (e.g., which have not necessarily exited or departed one or more memory controllers) when the preceding corresponding persistent commit demarcate instruction was performed, have been stored persistently, before at least any store to persistent memory instructions are executed after execution of the persistent commit block instruction. In some embodiments, the persistent commit block instruction when performed may be operative to cause the processor to ensure that at least all such demarcated store to persistent memory operations have been stored persistently before the persistent commit block instruction retires or otherwise commits.

In some embodiments, the assurance or guarantee of the persistent commit block instruction is with respect to persistency or durability of data. This is not the same thing as making a guarantee with respect to non-persistent memory (e.g., conventional main memory), where data may be lost in the event of a power failure and/or certain other events. In some embodiments, persistent commit block instruction when performed may not directly or actively cause the processor to force any data out of the processor (e.g., may not have a "flushing" operation). Rather, in some embodiments, the persistent commit block instruction when performed may be operative to cause the processor to stop or suspend performing additional subsequent instructions of at least one type and monitor for when the assurance or guarantee has been achieved and then allow the processor to resume performing additional subsequent instructions of the at least one type. In some embodiments, the processor may only stop or suspend performing store to persistent memory instructions. In other embodiments, the processor may stop or suspend performing both store to persistent memory instructions and store to non-persistent memory instructions. In still other embodiments, the processor may stop or suspend performing store to persistent memory instructions, store to non-persistent memory instructions, and other types of instructions (e.g., store to register instructions, all instructions, etc.). In some embodiments, the persistent commit block instruction may make an assurance or guarantee with respect to byte-granular or cacheline granular (e.g., for a cacheline size of cachelines of the processor) stores to persistent memory.

At block 338, stores may again be fenced. Such a fence may or may not be needed depending upon the particular implementation.

At block 339, one or more later stores may be performed to the persistent memory. These "later" stores are later than the "earlier" stores performed at block 331. Moreover, the earlier stores performed at block 331 occur before the performance of the persistent commit demarcate instruction at block 335, whereas the later stores performed at block 339 occur after the performance of the persistent commit demarcate instruction.

Figure 4:
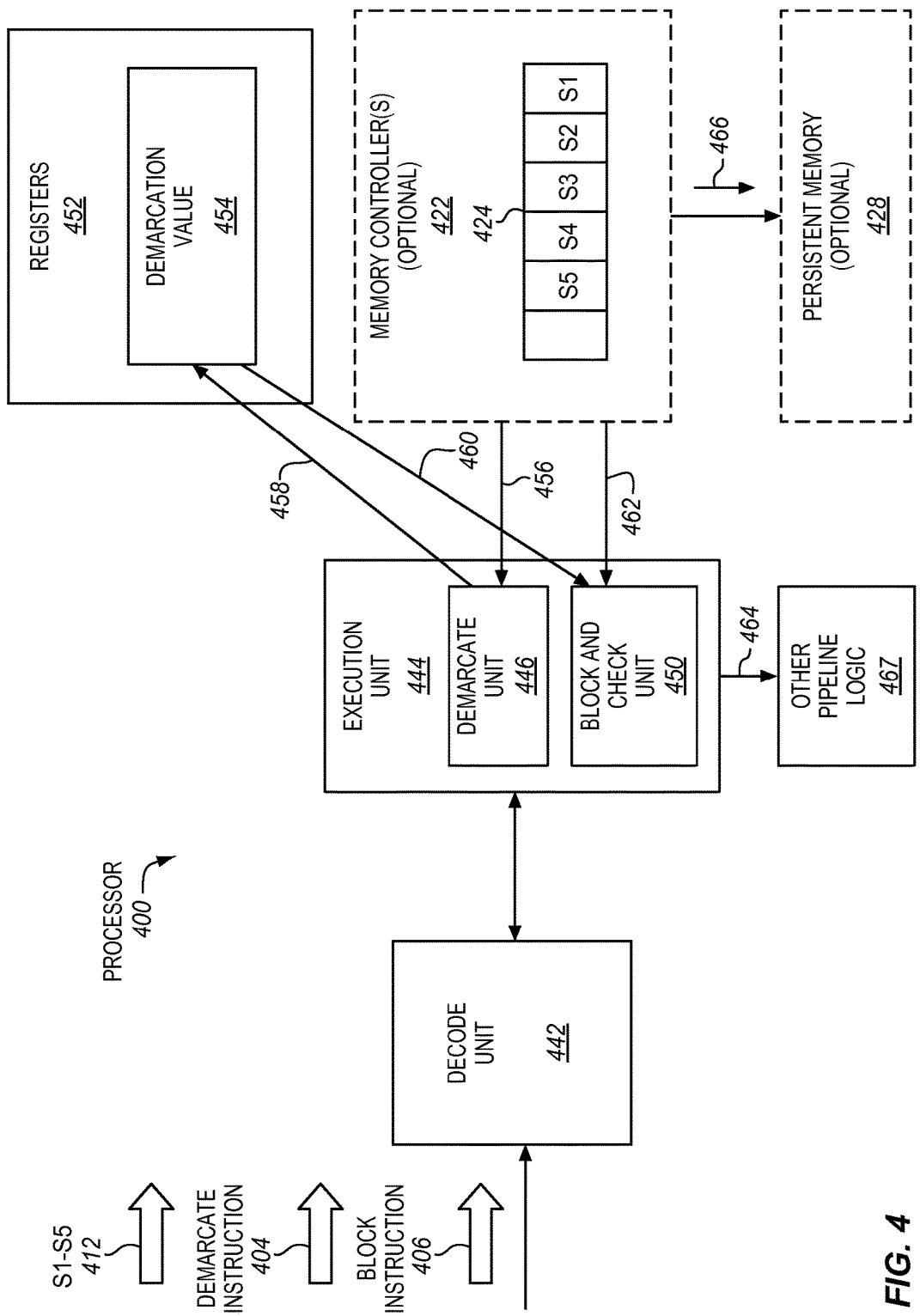
FIG. 4 is a block diagram of an embodiment of a processor that is operative to perform an embodiment of a persistent commit demarcate instruction and an embodiment of a persistent commit block instruction.

FIG. 4 is a block diagram of an embodiment of a processor 400 that is operative to perform an embodiment of a persistent commit demarcate instruction 404 and an embodiment of a persistent commit block instruction 406. In some embodiments, the processor 400 may perform the method 330 of FIG. 3. The components, features, and specific optional details described herein for the processor 400, also optionally apply to the method 300. Alternatively, the method 330 may optionally be performed by and/or within a similar or different processor or apparatus. Moreover, the processor 400 may optionally perform methods different than the method 330. In some embodiments, the processor 400 may be included in the system 210 of FIG. 2. Alternatively, the processor 400 may be included in a different system.

In some embodiments, the processor 400 may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, coprocessors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor may receive the persistent commit demarcate instruction 404. Subsequently, the processor may receive the persistent commit block instruction 406. For example, these instructions may be received from memory over a bus or other interconnect. The processor includes a decode unit or decoder 442. The decode unit may receive and decode each of the persistent commit demarcate instruction 404 and persistent commit block instruction 406. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level instructions received. In some embodiments, the decode unit may include one or more input structures (e.g., port(s), interconnect(s), an interface) to receive the instructions, an instruction recognition and decode logic coupled therewith to recognize and decode the instructions, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units.

The processor also includes a set of registers 452. In some embodiments, the registers may be general-purpose registers. Each of the registers may represent an on-die storage location that is operative to store data. The registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof.

In some embodiments, the persistent commit demarcate instruction 404 may explicitly specify (e.g., through one or more fields or a set of bits), or otherwise indicate (e.g., implicitly indicate), a destination register or other storage location where a demarcation value is to be stored. In some embodiments, the persistent commit block instruction 406 may explicitly specify (e.g., through one or more fields or a set of bits), or otherwise indicate (e.g., implicitly indicate), a source register or other storage location where a value is to be stored (e.g., a demarcation value of a preceding persistent commit demarcate instruction). As one example, each of these instructions may optionally have a storage location specification field to specify a register (e.g., one of the registers 452), a memory location, or other storage. Alternatively, storage location may optionally be implicit to the instruction (e.g., implicit to an opcode thereof). In one specific embodiment, the persistent commit demarcate instruction may optionally implicitly indicate (but not explicitly specify) a particular fixed general-purpose register for the destination storage location where the demarcation value is to be stored, although the scope of the invention is not so limited. In one specific embodiment, the persistent commit block instruction may optionally implicitly indicate (but not explicitly specify) the same particular fixed general-purpose register for its source storage location where the demarcation value is to be retrieved, although the scope of the invention is not so limited.

Referring again to FIG. 4, an execution unit 444 is coupled with the decode unit 442, the registers 452, and one or more memory controllers 422. The memory controller(s) are optional since in some embodiments they may be part of the processor (e.g., on-die) whereas in other embodiments they may be off-processor (e.g., on a chipset component). The execution unit may receive in turn the one or more decoded or otherwise converted instructions or control signals that represent and/or are derived from the persistent commit demarcate and persistent commit block instructions. The execution unit is operative in response to and/or as a result of the persistent commit demarcate and persistent commit block instructions (e.g., in response to one or more instructions or control signals decoded from the respective instruction) to perform operations to implement the respective instructions.

In some embodiments, the execution unit 444, in response to and/or as a result of the persistent commit demarcate instruction, may be operative to store 458 a demarcation value 454 in the specified or otherwise indicated destination storage location (e.g., one of the registers 452). In some embodiments, the demarcation value 454 may demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed.

In some embodiments, the execution unit may receive 456 the demarcation value from the one or more memory controllers 422. In some embodiments, one of the memory controller(s) may have a write pending buffer 424 to buffer or store pending writes that have been accepted to memory but not yet actually stored to memory (e.g., not stored to the persistent memory 428). When employed in a system the processor and the persistent memory 428 may be coupled (e.g., by a bus or other interconnect). As shown in the illustrated example, store operations S1 through S5 may be stored in the buffer. By way of example, store operation S1 may have been stored in the buffer first, and store operation S5 may have been stored in the buffer last. In the case of a first-in-first-out (FIFO) buffer, which is not required, S1 may leave the buffer first, S2 next, S3 next, and so on. By way of example, if only the store operations S1 through S4 were stored in the buffer at the time the persistent commit demarcate instruction was performed, and afterwards a new store operation S5 was stored in the store buffer, the demarcation 454 may include information sufficient to demarcate, indicate, or distinguish prior store operations S1-S4 from later store operation S5. Various different types of demarcations are possible, such as, for example, timestamps, counter tags, flags, tokens, etc. As shown, the execution unit may include a demarcate unit 446 to obtain and store the demarcation value.

In some embodiments, the execution unit 444, in response to and/or as a result of the persistent commit block instruction, may be operative to receive 460 a value from the specified or otherwise indicated source storage location (e.g., one of the registers 452). In some embodiments, the value may be the demarcation value 454 of the corresponding preceding persistent commit demarcate instruction 404. By way of example, both instructions may indicate the same register, the persistent commit demarcate instruction may be performed first to store the demarcation value in the register, and then the persistent commit block instruction may be performed to read the demarcation value from the register.

In some embodiments, the execution unit may also be operative, in response to and/or as a result of the persistent commit block instruction, to ensure that at least all store to persistent memory operations demarcated by the demarcation value and/or that arrived at one or more memory controllers 422 before a corresponding persistent commit demarcate instruction 404 was performed have been stored persistently (e.g., in the persistent memory 428), before at least any store to persistent memory instructions are executed after execution of the persistent commit block instruction. In some embodiments, the demarcation value may demarcate at least all store to persistent memory operations that are to have been accepted to memory when the preceding corresponding persistent commit demarcate instruction 404 was performed, but which are not necessarily to have been stored persistently (e.g., may still be in the write pending buffer 424) when the preceding corresponding persistent commit demarcate instruction was performed.

As shown, the execution unit may include a block and check unit 450. In some embodiments, the block and check unit may be operative to repeatedly check 462 with the at least one memory controller (or possibly other memory system units in other embodiments) on a current status reflecting whether all of the demarcated store to persistent memory operations (e.g., which arrived at the memory controller before the earlier persistent commit demarcate instruction 404 was performed) have been stored persistently (e.g., stored in the persistent memory 428). In some embodiments, the block and check unit and/or the execution unit may be operative to provide a block signal 464 to other pipeline logic 467 (e.g., which may be of various different types depending upon the particular implementation) to block or stop or suspend execution of other instructions of one or more types (e.g., only store to persistent memory instructions, or both store to persistent memory instructions and store to non-persistent memory instructions, or all instructions), which are to be executed after execution of the persistent commit block instruction, until the checking indicates that all of the demarcated store to persistent memory operations have been stored persistently. In some embodiments, the block signal may prevent additional store operations from entering the memory controller 422 and potentially becoming stored persistently. In some embodiments, this may be done for just store to persistent memory operations. In other embodiments, this may be done for both store to persistent memory operations and store to non-persistent memory operations. Blocking the performance of instructions in this way may effectively allow the processor to stop and wait for something that it wants to happen (e.g., the demarcated stores to become persistent) to actually happen, and then resume performing instructions after that happens. A successful check performed responsive to the persistent commit block instruction (e.g., indicating that the demarcated stores have become persistent) may serve as an indication that what the processor was waiting for has happened and the processor may responsively resume.

The execution unit and/or the processor may include specific or particular logic (e.g., transistors, integrated circuitry, or other hardware potentially combined with firmware (e.g., instructions stored in non-volatile memory) and/ or software) that is operative to perform the persistent commit demarcate and persistent commit block instructions. In the illustrated embodiment, for simplicity, the same execution unit is shown and described as processing both the persistent commit demarcate and block instructions, although in other embodiments, different execution units may optionally be used.

To avoid obscuring the description, a relatively simple processor has been shown and described. However, the processor may optionally include other processor components. For example, various different embodiments may include various different combinations and configurations of the components shown and described for any of FIGS. 10-12. All of the components of the processor may be coupled together to allow them to operate as intended.

Advantageously, software may use the persistent commit demarcate and persistent commit block instructions to obtain a guarantee that, when the persistent commit block instruction is committed, any controlling changes to persistent state that have been accepted by the memory system at the time of the performance of a preceding persistent commit demarcate instruction have been stored persistently or durably before subsequent stores following the persistent commit block instruction that depend on these earlier controlling changes to persistent state have made it to the power-failure safe domain. These instructions may be used to order stores to persistent memory so that undisciplined and/or improperly ordered stores to persistent memory don't occur and cause corruption of the persistent state. Without an ability to make such a guarantee, at the point of a power failure, the software may have no guarantee that earlier stores (e.g., the earlier stores at block 331 in FIG. 3) have been persistently stored, which could potentially lead to permanent loss of data, a corrupted persistent memory state, or the like. Also, by preventing dependent stores or other operations from proceeding until the demarcated stores, which were accepted to memory but not yet stored persistently at the time of demarcation, software may have the freedom to perform independent operations during the interval between the persistent demarcate instruction and the persistent block instruction.

Depending upon the particular implementation, persistent commit block instruction may tend to have relatively long completion times and/or the completion times may tend to be relatively variable. By way of example, in one implementation it is estimated that the completion times may commonly be from around one hundred to several hundred clock cycles (e.g., potentially several hundred nanoseconds), with occasional longer durations of around several thousand clock cycles (e.g., potentially around a microsecond) occurring. One contributing reason for such relatively long and/or relatively variable completion times is that the stores to persistent memory may depend in part on factors such as the number of stores accepted to memory at the time when an persistent commit demarcate instruction is performed, typical access latencies to the persistent memory, the time-distribution and/or space-distribution of the stores to persistent memory (e.g., persistent memory range overlaps), the depths of power safe queues in the persistent memory modules (if used), write amplifications, whether or not a particular line being modified in persistent memory is the subject of an overwrite or a read, and other factors. Moreover, another contributing reason for such relatively long and/or relatively variable completion times is that, in some embodiments, these instructions may be used to implement a global persistency guarantee, which may therefore depend in part on stores to persistent memory from not only one memory controller, but potentially multiple different memory controllers, at the time when persistent commit demarcate instruction is performed.

In some embodiments, the persistent commit demarcate and persistent commit block instructions may represent two different instructions that may be performed together to commit stores to persistent memory. In some embodiments, the two instructions may be performed together to implement a split handshake with hardware of the processor (e.g., memory interface units and/or memory controllers) in order to commit the stores to persistent memory and achieve the intended guarantee. The split handshake may include performing the persistent commit demarcate instruction to interact with the hardware to obtain the demarcation value. The persistent commit demarcate instruction, however, may not cause the processor to stop performing any types of instructions in order to prevent store operations from becoming persistent. Then, a second part of the split handshake may include performing the persistent commit block instruction to interact with the hardware to block performance of instructions following it of one or more different types (e.g., store to persistent memory instructions, or both store to persistent memory instructions and store to non-persistent memory instructions, or all instructions) to ensure that the demarcated instructions have been stored persistently before at least any store to persistent memory instructions are executed after execution of the persistent commit block instruction (e.g., because otherwise they could potentially be stored persistently in a contrary order).

Using these two different instructions to commit stores to persistent memory in this way may optionally allow the blocking to be deferred or delayed for a period of time. While the blocking or waiting operation is being deferred, other non-dependent work (e.g., the non-dependent work performed at block 336 of FIG. 3) may optionally be performed asynchronously. Such non-dependent work does not need to synchronously wait until the demarcated store operations of the persistent commit demarcate instruction have been stored persistently (i.e., no lock-step operation is needed), but rather the non-dependent work may be performed asynchronously and concurrently while these stores proceed to become stored persistently. Since the blocking or waiting operation associated with the persistent commit block instruction causes a performance penalty (e.g., in some embodiments execution of at least store to persistent memory instructions may be suspended), deferring it, while allowing such unrelated or at least non-dependent work to be performed, may help to reduce the overall performance penalty needed to perform these instructions. By way of example, this may optionally allow software to overlap multiple different write streams to the persistent memory from within the same region of code and ensure the necessary partial order among persistent memory commits, instead of an unnecessary total order. Moreover, when the blocking or waiting operation is eventually performed (e.g., when the persistent commit block instruction is performed), the blocking or waiting time will typically be for a shorter time (on average), since some of the demarcated persistent commits were able to occur between the times when the persistent commit demarcate and block instructions were performed.

These instructions may give software a light-weight architectural mechanism to commit stores to persistent memory, with an ability to defer the blocking synchronous wait, and allow the processor to asynchronously perform non-dependent work between the times the two instructions are performed. This may potentially and optionally help to achieve software pipelining for persistent memory in which computations in one iteration of a loop create values to be committed in a forward iteration, and computations in each iteration harvest the previous iterations asynchronous persistent memory commits to continue flowing newer dependent values to persistent memory. This may potentially and optionally help to capitalize on Intel® Transactional Synchronization Extensions (Intel® TSX). For example, Intel® TSX may freely produce dependent future values after the persistent commit demarcate, but hold them from flowing towards persistent memory until after a corresponding persistent commit block is performed.

To further illustrate certain concepts, consider the following example code.

| | | |
|---|---|---|
| a. | Line 1 | mov memX, 4   // write 4 to memory location X in persistent memory |
| b. | Line 2 | mov memY, 9   // write 9 to memory location Y in persistent memory |
| c. | Line 3 | sfence   // fence stores |
| d. | Line 4 | clwb memX   // force X from caches |
| e. | Line 5 | clwb memY   // force Y from caches |
| f. | Line 6 | sfence   // fence stores |
| g. | Line 7 | pc_demarcate R   // persistent commit demarcate instruction |
| h. | Line 8 | add reg2, 12   // add 12 to register 2 |
| i. | Line 9 | mov memZ, 18   // write 18 to memory location Z in persistent memory |
| j. | Line 10 | add memW, 28   // add 28 to memory location W in non-persistent memory |
| k. | Line 11 | pc_block R   // persistent commit block instruction |
| l. | Line 12 | add reg2, 17 // add 12 to register 2 |
| m. | Line 13 | mov memW, 14 // write 18 to memory location W in non-persistent memory |
| n. | Line 14 | mov memX, 16 // write 16 to memory location X in persistent memory |

In this code, pc_demarcate is an embodiment of a persistent commit demarcate instruction, and pc_block is an embodiment of a persistent commit block instruction. In some embodiments, neither pc_demarcate or pc_block block or prevent performance of the instructions of lines 8-10. In some embodiments, the instructions of instructions of lines 8-10 may be performed and the instruction of line 9 may even store to persistency even before any guarantee that the stores of the instructions of lines 1-2 have become persistent.

After the pc_block instruction of line 11 is performed, in some embodiments, performance of one or more types of instructions following the instruction of line 11 may be stopped as well as any stores to persistent memory that would result therefrom. Different types of instructions may be prevented from being performed in different embodiments. In some embodiments, the performance of stores to persistent memory may be stopped (e.g., the instruction of line 14 may be stopped). In other embodiments, both the performance of stores to persistent memory may be stopped (e.g., the instruction of line 14 may be stopped) and also the performance of stores to non-persistent memory may optionally be stopped (e.g., the instruction of line 13 may also be stopped). By way of example, the pipeline logic of the processor may examine address ranges of stores to persistent memory and stores to non-persistent memory (e.g., as configured by range registers of the processor) and selectively perform or not perform the instructions accordingly. In still other embodiments, the performance of stores to persistent memory may be stopped (e.g., the instruction of line 14 may be stopped), and the performance of stores to non-persistent memory may optionally be stopped (e.g., the instruction of line 13 may also be stopped), and the performance of stores to processor architectural registers may optionally be stopped (e.g., the instruction of line 12 may also be stopped), or instructions of most if not all types may optionally be stopped. Such stopping of the performance of these instructions may end when, responsive to the pc_block instruction of line 11, it is determined that all store to persistent memory operations before the pc_demarcate instruction have been committed to persistence (e.g., the stores of the instructions of lines 1-2 have been stored persistently).

Figure 5:
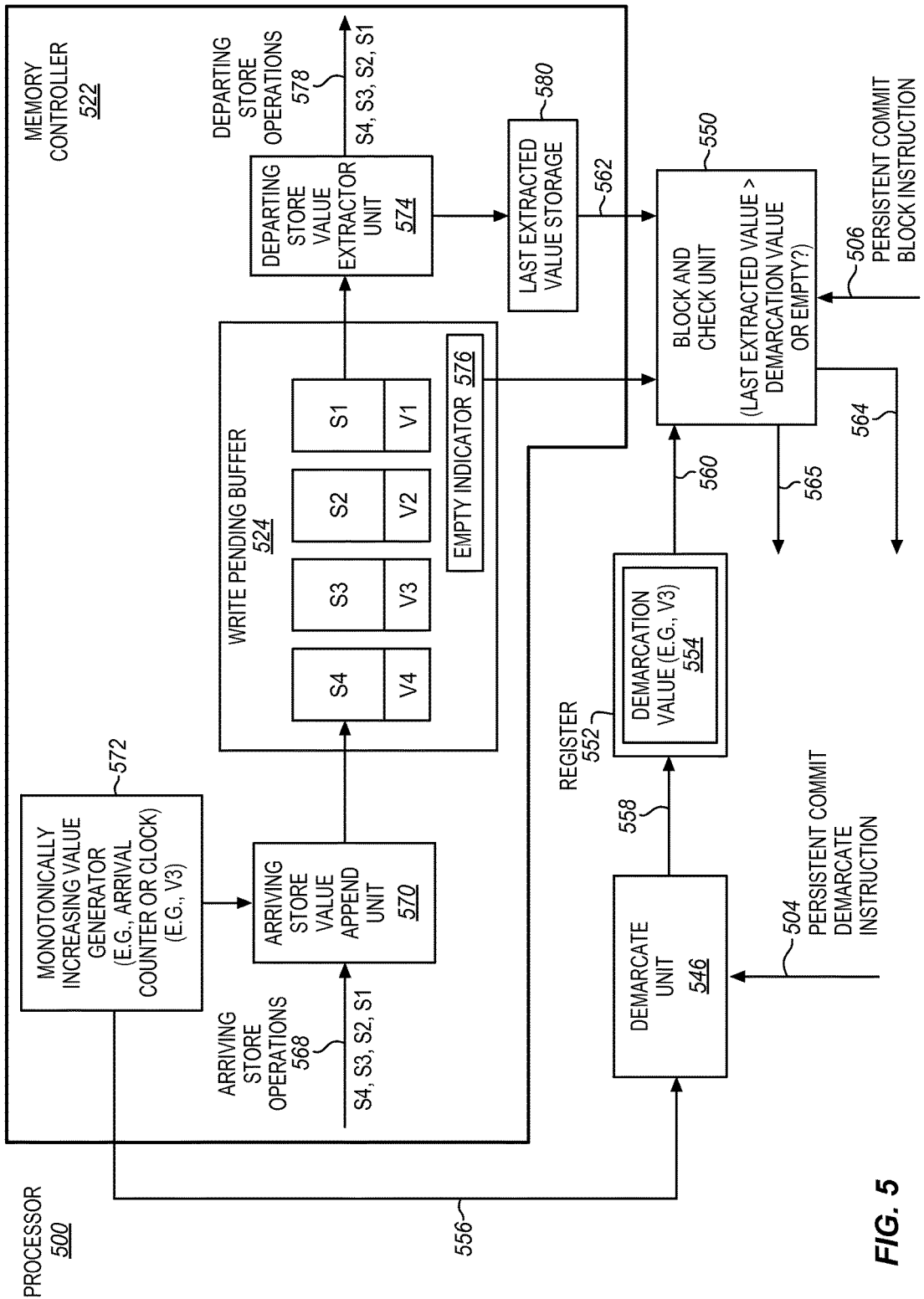
FIG. 5 is a block diagram of an example embodiment of a processor that is operative to use monotonically increasing values appended to arriving store operations at a memory controller to determine demarcation values.

FIG. 5 is a block diagram of an example embodiment of a processor 500 that is operative to use monotonically increasing values (V1, V2, V3, V4) appended to arriving store operations 568 (e.g., S1, S2, S3, S4) at a memory controller 522 to determine demarcation values 554. The memory controller may receive the arriving store operations 568. The arriving store operations may include at least some store to persistent memory operations. As shown, the arriving store operations may include the store operations S1, S2, S3, and S4.

The memory controller has an arriving store value append unit 570. The arriving store value append unit is coupled with a monotonically increasing value generator 572. The monotonically increasing value generator may or may not be part of the memory controller. The monotonically increasing value generator is operative to generate monotonically increasing values over time. One example of a suitable monotonically increasing value generator is a store operation arrival counter that is operative to count arriving store operations (e.g., increment a counter each time a new store operation arrives). For example, if three store operations arrive in sequence, the first may be given a count X, the next a count of (X+1), and the next a count of (X+2). Another example of a suitable monotonically increasing value generator is a free running clock or other timer that is operative to keep an increasing time value. Each arriving store operation may be tagged with a timestamp value indicating when that store operation arrived. Other examples of monotonically increasing value generators are also contemplated.

The arriving store value append unit 570 may be operative to tag or otherwise append a current value from the monotonically increasing value generator to each arriving store operation. For example, a first value (V1) may be appended to a first arriving store operation (S1), a second increased value (V2) may be appended to a subsequently arriving store operation (S2), and so on. The arriving store operations with the appended values may be stored in a write pending buffer 524. The appended values may stay with the store operations as they move through the write pending buffer.

The memory controller includes a departing store operation value extractor unit 574 that may be operative to extract the appended values before the store operations leave the memory controller as departing store operations (e.g., transmitted on a bus to persistent memory). As shown, the store operations S1, S2, S3, and S4 may leave without the values V1, V2, V3, and V4. As each store operation departs the memory controller in order, the extractor unit may save the corresponding extracted value in a last extracted value storage 580 (e.g., a scratchpad, a temporary register, etc.). By way of example, in the specific case of the values being timestamps indicating relative times when the corresponding store operations arrived at the memory controller, in a FIFO queue the last timestamp extracted (indicating the time when the corresponding store operation arrived) may be saved. The memory controller may also optionally have an empty indicator 576 that is operative to indicate when the write pending buffer becomes empty.

A demarcate unit 546 is coupled with the memory controller 522 and/or the monotonically increasing value generator 572. The demarcate unit, responsive to and/or as a result of a persistent commit demarcate instruction 504 (e.g., one or more decoded control signals therefrom), may be operative to receive 556 a current value from the monotonically increasing value generator and store 558 the received value as a demarcation value in a register 552. By way of example, if the persistent commit demarcate instruction was performed when store operation S3 was the most recent store operation to arrive at the memory controller, then the arrival value V3 (e.g., an arrival counter value, an arrival timestamp value, etc.) may be received from the monotonically increasing value generator and stored as the demarcation value.

A block and check unit 550 is coupled with the register 552 and the memory controller 522. In various embodiments, the block and check unit may either be part of the memory controller or may be separate from but coupled with the memory controller (e.g., may be in a separate execution unit). The demarcate unit, responsive to and/or as a result of a persistent commit block instruction 506 (e.g., one or more decoded control signals therefrom), may be operative to receive 560 the demarcation value from the register. The block and check unit may be operative to repeatedly check 562 the last extracted value storage 562 to determine the last or maximum value extracted from the departing store operations that have departed the execution unit. The block and check unit may be operative to determine whether the last or maximum value from the last extracted value storage is greater than (or in another embodiment greater than or equal to) the demarcation value, or if the empty indicator indicates that the write pending buffer is empty. If either of these is determined to be true, then the block and check unit may provide a stop block signal 565. In some embodiments, the stop block signal may cause resumption of performing one or more types of instructions whose performance was stopped responsive to the persistent commit block instruction while the last or maximum value was less than the demarcation value. The stop block signal may indicate that something that the processor was waiting to happen has happened and now the processor may resume performing one or more types of instructions that it previously stopped performing. By way of example, if the last extracted value storage has an arrival counter value of V4 (e.g., the number 57456) and the demarcation value has the value of V3 (e.g., 57455), then the block and check unit may determine to stop blocking (e.g., since the monotonically increasing value for V4 will be greater than the monotonically increasing value for V3). Otherwise, the block and check unit may be operative to continue to provide a block signal 564 to stop cause the execution or performance of one or more types of instructions to be stopped while the last or maximum value is less than the demarcation value.

In some embodiments, the demarcation value may pertain to time order (e.g., the time order of arrival of store operations at the memory controller(s)), whereas the persistent commit block instruction may perform blocking that pertains to program order. When there are one or more caches in a system there may be no direct correlation between memory order (e.g., the time order of arrival of store operations at a memory controller) and program order. The caches may alter the order at which stores made through the caches arrive at the memory controller(s). For example, this may depend upon factors such as whether the stores are write back, write through, or write combining types of stores, the timing of cache evictions, etc.

Figure 6:
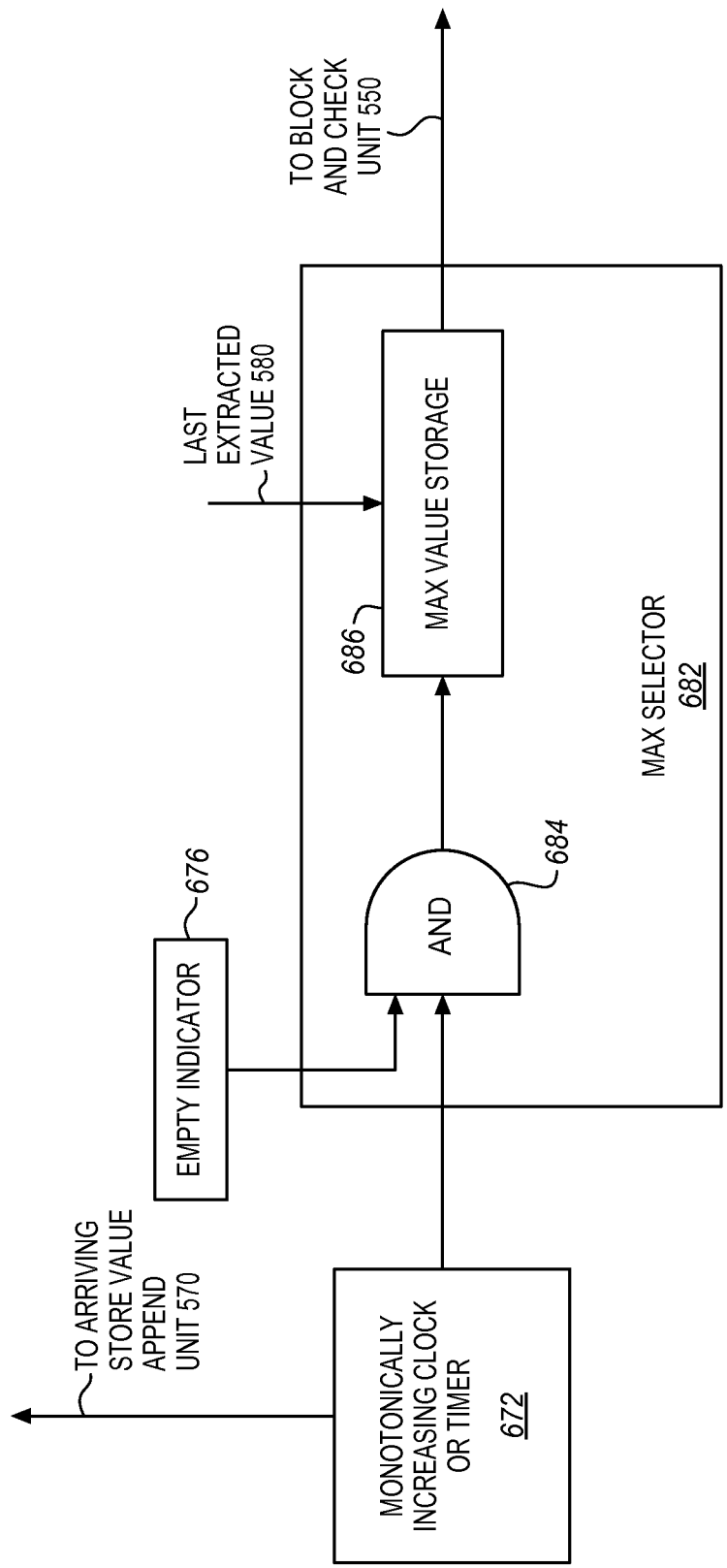
FIG. 6 is a block diagram of an example embodiment of a maximum value selector.

FIG. 6 is a block diagram of an example embodiment of a maximum value selector 682. The maximum value selector is coupled with a monotonically increasing clock or timer 672 (e.g., a free running clock or timer). The clock or timer may be used to provide values to an arriving store value append unit 570. These values may be input to an AND logic 684 of the maximum value selector. An empty indicator 676 may also be input to the AND logic. The AND logic is operable to output the value from the clock or timer when the empty indicator indicates that the write pending buffer queue is empty. The output of the AND logic and a last extracted value from a last extracted value storage 580 is input to a maximum value storage 686. Unless the empty indicator indicates that the write pending buffer queue is empty, the maximum value storage is operative to store the last extracted value 580. However, when the empty indicator indicates that the write pending buffer queue is empty, the maximum value storage stores the maximum value, which will typically be the value from the clock or timer value 672 (e.g., which typically continues to increase). This may help to avoid needing to have to explicitly check the empty indicator because the output of the maximum value storage may automatically reflect it. The output of the maximum value storage is provided to a block and check unit 550.

To simplify the description, the above discussion of the approach in FIG. 5 was described in the context of a single memory controller. However, the approach also works when there are multiple memory controllers.

Figure 7:
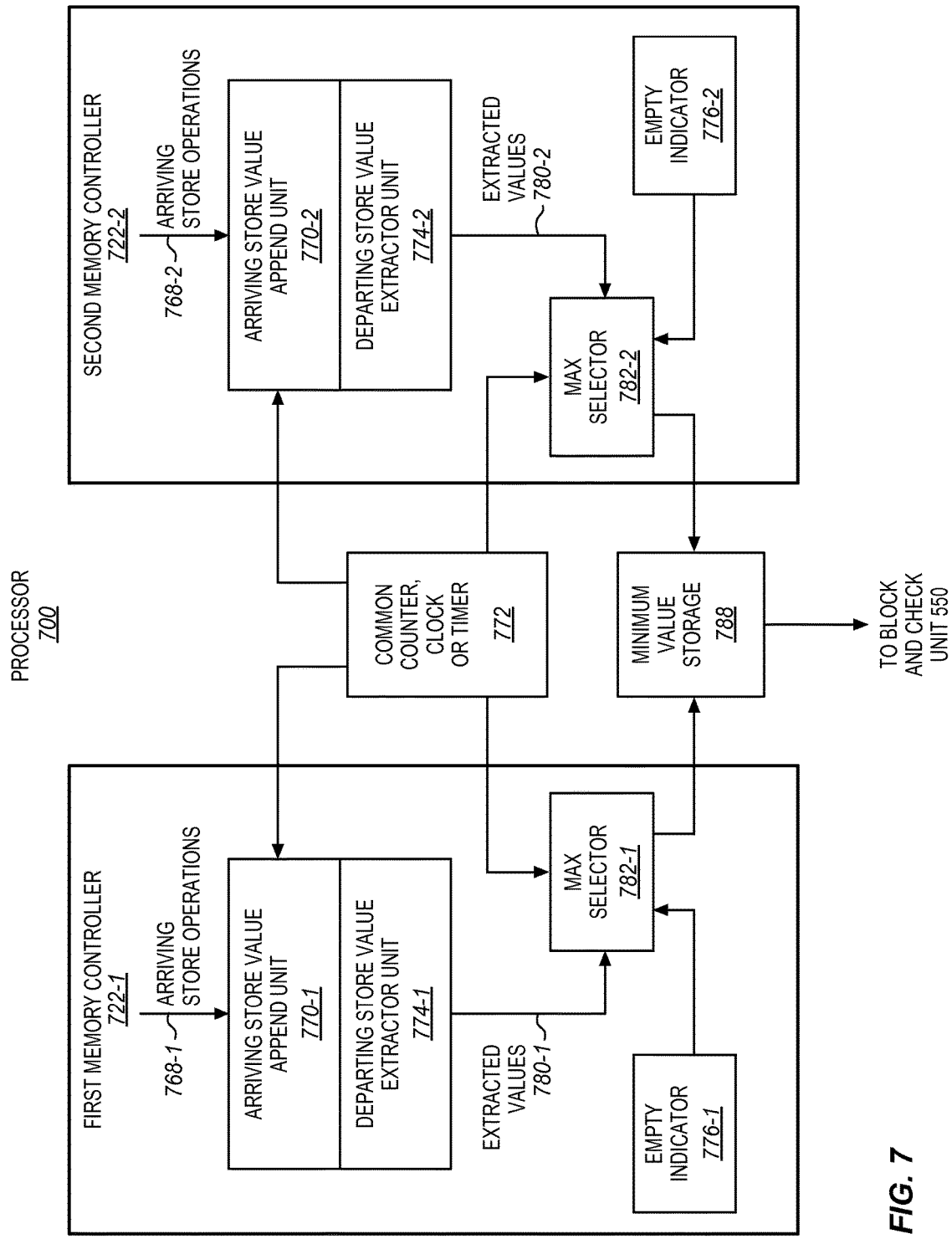
FIG. 7 is a block diagram of an example embodiment of a processor that is operative to perform a persistent commit block instruction with multiple memory controllers.

FIG. 7 is a block diagram of an example embodiment of a processor 700 that has multiple memory controllers 722. In the illustrated embodiment, for simplicity, only a first memory controller 722-1 and a second memory controller 722-2 are shown, although the processor may optionally have other numbers of memory controllers used in an analogous way. Each of the memory controllers may receive arriving store operations 768-1, 768-2. Each of the memory controllers has an arrive store value append unit 770-1, 770-2 to append monotonically increasing values useful for determining demarcation values to the arriving store operations as previously described in conjunction with FIG. 5.

As shown, in some embodiments, each of the memory controllers may share a common clock, timer, or counter 772. The single shared common clock, timer, or counter may be operative to generate monotonically increasing values. In an alternate embodiment, instead of having the single shared clock, timer, or counter, each of the memory controllers may optionally have a different corresponding clock, timer, or counter, and these different clocks, timers, or counters may be synchronized or otherwise made to produce mutually consistent values. For example, if store operations arrive at the same time at two different memory controllers the synchronized or mutually consistent clocks or timers would generate the same timestamp values. Known approaches for synchronizing clocks, timers, or counters are suitable. As one possible example, the clocks or timers may optionally be synchronized using an Intel® Quickpath Interconnect based clock exchange and synchronization approach.

Such monotonically increasing and synchronized or otherwise mutually consistent values may have global relevance across all of the memory controllers. In other words, if any first value is less than any second value then it means that the store operation corresponding to the first value arrived before the store operation corresponding to the second value regardless of which memory controller it arrived at. This may help to allow a single demarcation value to be determined and used to order persistent commits following demarcation instructions across all of the memory controllers.

Referring again to FIG. 7, each of the memory controllers has a departing store value extractor unit 774-1, 774-2 to extract and output extracted values 780. Each of the memory controllers has a maximum value selector 782-1, 782-2. In some embodiments, the maximum value selectors may be the same as, or similar to, the maximum value selector 682 of FIG. 6. As shown, each memory controller also has an empty indicator 776-1, 776-2 to indicate when the corresponding store pending buffer or queue is empty. The empty indications may be provided to the respective maximum value selectors. The monotonically increasing and mutually consistent values (e.g., from the common clock, timer, or counter 772 or else from synchronized or otherwise mutually consistent clocks, timers, or counters) may also be provided to the maximum value selectors. The maximum value selectors may be operative to select a maximum value of either the extracted values or when the empty indicator indicates the buffer or queue is empty the monotonically increasing and mutually consistent values (e.g., as previously described for FIG. 6). A minimum value storage 788 is coupled with an output of each of the maximum value selectors. The minimum value storage may store the minimum of the outputs of all of the maximum value selectors. This minimum stored value may be provided to a block and check unit 550. The minimum value over all of the different memory controllers ensures that the demarcation value obtained by a persistent commit demarcate instruction is compared with the least valued store operation that is departing. The use of such a minimum value across all of the different memory controllers may help to allow a persistent commit block instruction to block until the minimum value is greater than or equal to the demarcation value indicating that all needed preceding persistent commits to persistency differentiated by the demarcation value have completed to persistency across all of the different memory controllers.

In the case of non-FIFO persistency commits out of the memory controllers, in some embodiments, a sliding bitmap window may optionally be used. The sliding bitmap window may range from the smallest value that has not yet been committed to persistence, and the largest value that has been issued at the memory controller or at any of the memory controllers. Let value R represent the smallest value in the bitmap, which may represent a right-edge of the bitmap window. Then, if either the value R is greater than the demarcation value, or for the bitmap window the difference between the demarcation value and the value R is equal to zero, then the waited for store operations have already committed to persistence.

Recall that, as shown in FIG. 1, in some embodiments an instruction set may also optionally include a persistent commit check instruction 108, although this is not required. The persistent commit check instruction may be decoded (e.g., by the decode unit 442) and executed (e.g., by the execution unit 444 or a different execution unit) analogously to other instructions disclosed herein.

In some embodiments, the persistent commit check instruction may explicitly specify (e.g., through one or more fields or a set of bits), or otherwise indicate (e.g., implicitly indicate), a destination storage location where the current status or value is to be stored. As one example, the persistent commit check instruction may optionally have a storage location specification field to specify a register (e.g., one of the registers 452), a memory location, or other destination storage location. Alternatively, destination storage location may optionally be implicit to the instruction (e.g., implicit to an opcode thereof). In one specific embodiment, the persistent commit check instruction may optionally implicitly indicate (but not explicitly specify) a particular fixed general-purpose register for the destination storage location which is a different general-purpose register than a general-purpose register implicitly indicated by an embodiment of a persistent commit demarcate instruction and/or an embodiment of a persistent commit block instruction. The implicit use of such different registers may help to avoid needing to overwrite the demarcation value that may be used by each of the persistent commit demarcate and block instructions.

In some embodiments, the persistent commit check instruction if performed may be operative to cause an associated execution unit and/or the processor to store a value in the indicated destination storage location. In some embodiments, the value may be indicative of whether at least all store to persistent memory operations demarcated by a preceding corresponding persistent commit demarcate instruction (e.g., store to persistent memory operations that are to have been accepted to memory when an indicated preceding corresponding persistent commit demarcate instruction was performed, but which are not necessarily to have been stored persistently when the preceding corresponding persistent commit demarcate instruction was performed) have now been stored persistently. The value need not necessarily apply to any one specific demarcation value, but rather may apply to various demarcation values (e.g., a monotonically increasing value reflecting a current status of departing store operations may apply to previous such monotonically increasing values representing demarcation values).

In some embodiments, the value stored may not only indicate whether the demarcated store to persistent memory operations have now been stored persistently but may also be indicative of a current level or status or measure of completion of the demarcated store operations. Different measures of completion are suitable for different embodiments. Examples of suitable measures of completion include, but are not limited to, estimated time needed to complete the demarcated persistent stores, estimated percentage of demarcated persistent stores that have been stored persistently, difference between the demarcation value and a value reflecting a most recently departed store operation to persistent memory, and the like. By way of example, in various embodiments, the persistent commit check instruction when performed may be operative to cause the associated execution unit and/or the processor to read one of the last extracted value storage 580 in FIG. 5, the maximum value storage 686 in FIG. 6, the minimum value storage 788 of FIG. 7, or the like. In some embodiments, in contrast to the persistent commit block instructions previously described, the persistent commit check instruction when performed may not block or stop or suspend execution of any types of instructions.

One specific example embodiment of a persistent commit check instruction may indicate a source register that is to have a demarcation value and a destination register that is to be used to store a level of completion value. If all of the demarcated store to persistent memory operations distinguished by the demarcation value have been persistently stored, a value indicating full completion (e.g., a zero value) may be stored in the destination. Otherwise, a value indicating a current level of progress or status may be stored. This level of status or progress may serve as a hint that software may use to estimate an amount of time (which the software may do in various ways without limitation) until the demarcated store to persistent memory operations have been completed. This is just one illustrative example of a suitable persistent commit check instruction.

In some embodiments, the persistent commit check instruction may be used along with a persistent commit demarcate instruction and the persistent commit block instruction. For example, in some embodiments, one or more instances of the persistent commit check instruction may optionally be used after a persistent commit demarcate instruction to allow software to measure or determine the current level of progress or status toward completing the persistent storage of store operations that preceded the persistent commit demarcate instruction, and were demarcated by the demarcation value, so that software can determine whether or not to continue to defer performing a subsequent persistent commit block instruction. As mentioned above, the persistent commit block instruction may perform a blocking operation and may therefore have an associated performance penalty. Moreover, the time needed for all of the preceding stores to be committed to persistence can potentially be long and/or potentially be variable. Accordingly, a possible advantage of the persistent commit check instruction is to help allow software to measure and adapt to such potentially long and/or potentially variable times and optionally defer performing the persistent commit block instruction until an appropriate and optionally maximally deferred time.

Figure 8:
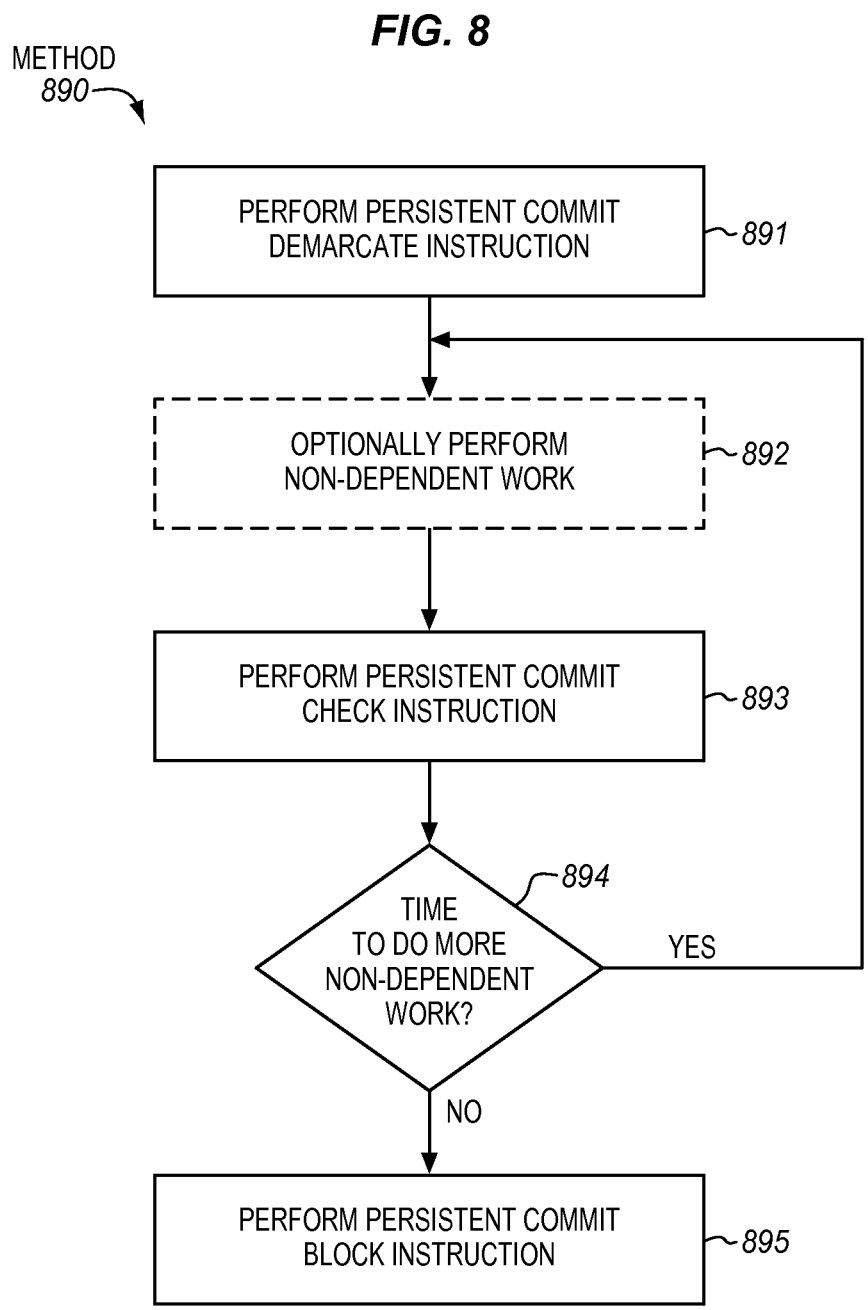
FIG. 8 is a block flow diagram of one possible example of a method performed with a processor in which an embodiment of a persistent commit check instruction may be used with an embodiment of a persistent commit demarcate instruction and an embodiment of a persistent commit block instruction.

FIG. 8 is a block flow diagram of one possible example of a method 890 performed with a processor in which an embodiment of a persistent commit check instruction may be used with an embodiment of a persistent commit demarcate instruction and an embodiment of a persistent commit block instruction. The method includes performing a persistent commit demarcate instruction, at block 891. This may be done as described elsewhere herein. The method optionally includes performing non-dependent work at block 892. As described elsewhere herein, this may represent work that does not depend on the stores to persistent memory demarcated by a demarcation value associated with the persistent commit demarcate instruction.

At block 893, a persistent commit check instruction may be performed. In some embodiments, this may include reading or otherwise determining and storing a value that indicates whether or not all of the demarcated store to persistent memory operations have completed. In some embodiments the value may be indicative of a current status or level toward persistently storing these demarcated store operations, without blocking or preventing execution of any instructions. By way of example, in various embodiments, this may include reading and storing in a register one of the last extracted value storage 580 in FIG. 5, the maximum value storage 686 in FIG. 6, the minimum value storage 788 of FIG. 7, or the like, without blocking or preventing any persistent store operations.

At block 894, a determination may be made whether or not there is time to do more non-dependent work. For example, software may access the value read and stored by the persistent commit check instruction and compare it with the demarcation value stored by the persistent commit demarcate instruction. If the difference is large enough, for example if the difference surpasses a configurable threshold value, then the determination may be that there is enough time to do more non-dependent work (i.e., "yes" may be the determination). In such a case, software may optionally decide to revisit block 892 where more non-dependent work may optionally be performed. Conversely, if the difference is not perceived by the software to be large enough, for example if the difference does not surpass a configurable threshold value, then the determination may be that there is not enough time to do more non-dependent work (i.e., "no" may be the determination). In such case, the method may advance to block 895. By way of example, this may optionally be performed with a language level co-routine. This construct may optionally allow for easier construction of software pipelined transactions in which groups of transactions that affect independent variables may pass control back and forth to overlap processor usage with intervals over which durable commits are achieved.

At block 895, a persistent commit block instruction may be performed. As previously described, the persistent commit block instruction when performed may be operative to block or stop the performance of subsequent instructions following the persistent commit block instruction of one or more types (e.g., store to persistent memory instructions, both store to persistent memory and store to non-persistent memory instructions, all instructions, etc.) until all store to persistent memory operations demarcated by the preceding persistent commit demarcate instruction have been stored persistently. This may cause a performance penalty. However, by having the block operation in a separate instruction from the persistent commit demarcate instruction helps to reduce this performance penalty. Moreover, by having the non-blocking persistent commit check instruction software may measure progress and intelligently determine how long the persistent commit block instruction can be deferred thereby further helping to reduce the performance penalty. Software may use multiple instances of the persistent commit check instruction performed sequentially at different times to implement a polled-for-completion operation in which the persistent commit block instruction may be deferred over and over again based on the measurements of the persistent commit check instruction (e.g., even maximally deferred) and then performed before it is needed. Alternatively, the software may use the persistent commit check instruction to ensure that it does not need to perform the persistent commit block instruction at all. Advantageously, such instructions may help to allow software to efficiently handle the potentially long and/or potentially variable times needed to persistently order stores accepted to memory but that have not yet left one or more memory controllers.

Figure 9:
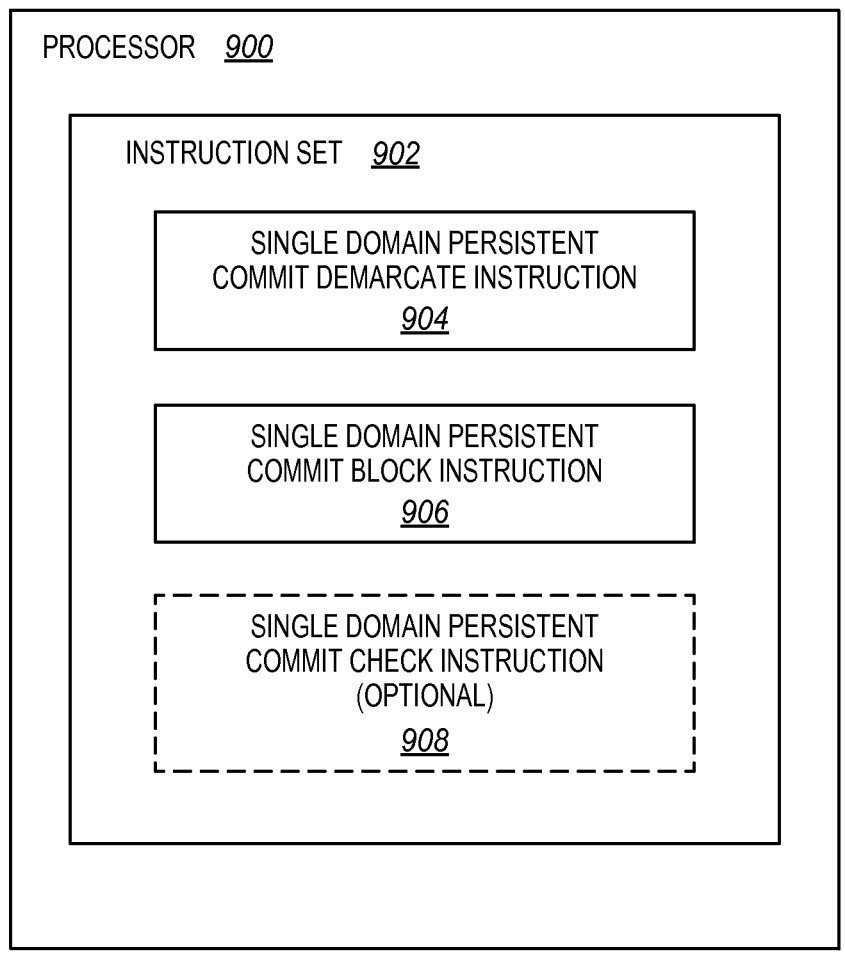
FIG. 9 is a block diagram of an embodiment of a processor having an instruction set with embodiments of domain specific persistent commit instructions.

FIG. 9 is a block diagram of an embodiment of a processor 900. The processor has an instruction set 902. As shown, in some embodiments, the instruction set may include a single domain persistent commit demarcate instruction 904, a single domain persistent commit block instruction 906, and an optional single domain persistent commit check instruction 908, although this is not required. Alternatively, in other embodiments, the instruction set may optionally include a subset of the illustrated instructions (e.g., as few as any single one of these instructions).

In some embodiments, each of these instructions may be similar to the correspondingly named instructions disclosed above, except that they may apply to a single memory controller domain instead of multiple memory controller domains. In some embodiments, the instructions may specify or otherwise indicate that domain (e.g., indicate a logical processor identifier). In some embodiments, each of these instructions may operate independently for each of multiple memory controllers. Software may use these instructions in turn against either all or some of the memory controllers to ensure that its dependencies are satisfied at each memory controller in parallel. For example, the software may synthesize a multi-memory controller persistency handshake with separate per-memory controller handshakes (e.g., separate demarcation values in each memory controller domain). This allows software to work efficiently, particularly when all of its operations are limited to a single Non-uniform memory access (NUMA) domain by design. In such a case, software may only needs to perform ordering in a single NUMA domain.

One potential advantages of these single domain instructions is flexibility, and a potential performance benefit from not having to stall a persistent commit block instruction that needs a handshake only with a subset of memory controllers (e.g., when all cache lines for a particular transaction are known to be in the same NUMA domain). While this scheme uses more instructions, it does not necessarily have correspondingly higher number of stalls, since a wait at one memory controller may also cover the time it takes for other memory controllers to drain.

FIG. 7 and FIG. 9 show two different embodiments suitable for multiple memory controllers. These different embodiments are not mutually exclusive but rather may optionally be used together. The use of such monotonically increasing values is one possible way in which embodiments may be implemented. However, other ways are also contemplated. For example, one possible approach is to force all the memory controllers to completely drain and become empty without allowing any new values to go in between the demarcate and block instructions. Still other ways will be apparent to those skilled in the art and having the benefit of the present disclosure.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 11B:
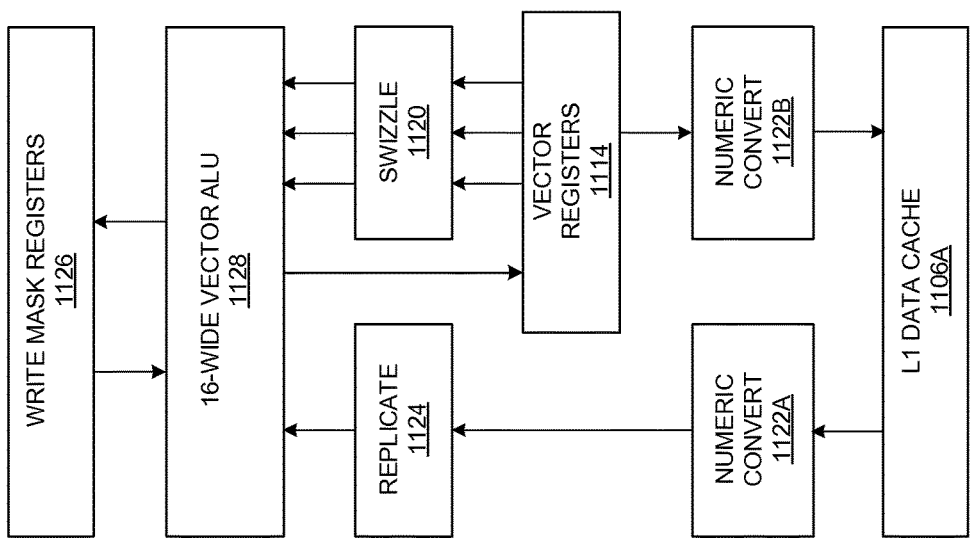
FIG. 11B is a block diagram of an embodiment of an expanded view of part of the processor core of FIG. 11A.
Figure 11A:
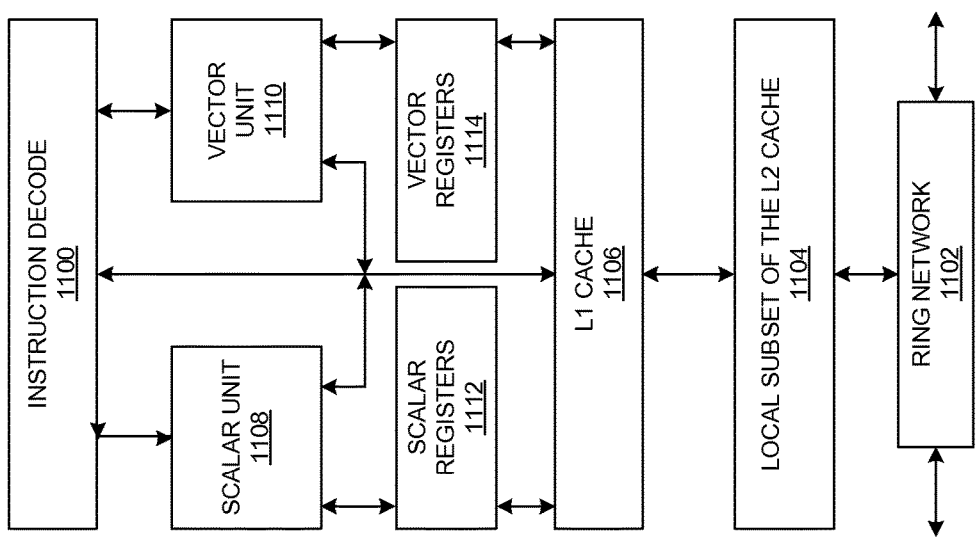
FIG. 11A is a block diagram of an embodiment of a single processor core, along with its connection to the on-die interconnect network, and with its local subset of the Level 2 (L2) cache.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 11112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
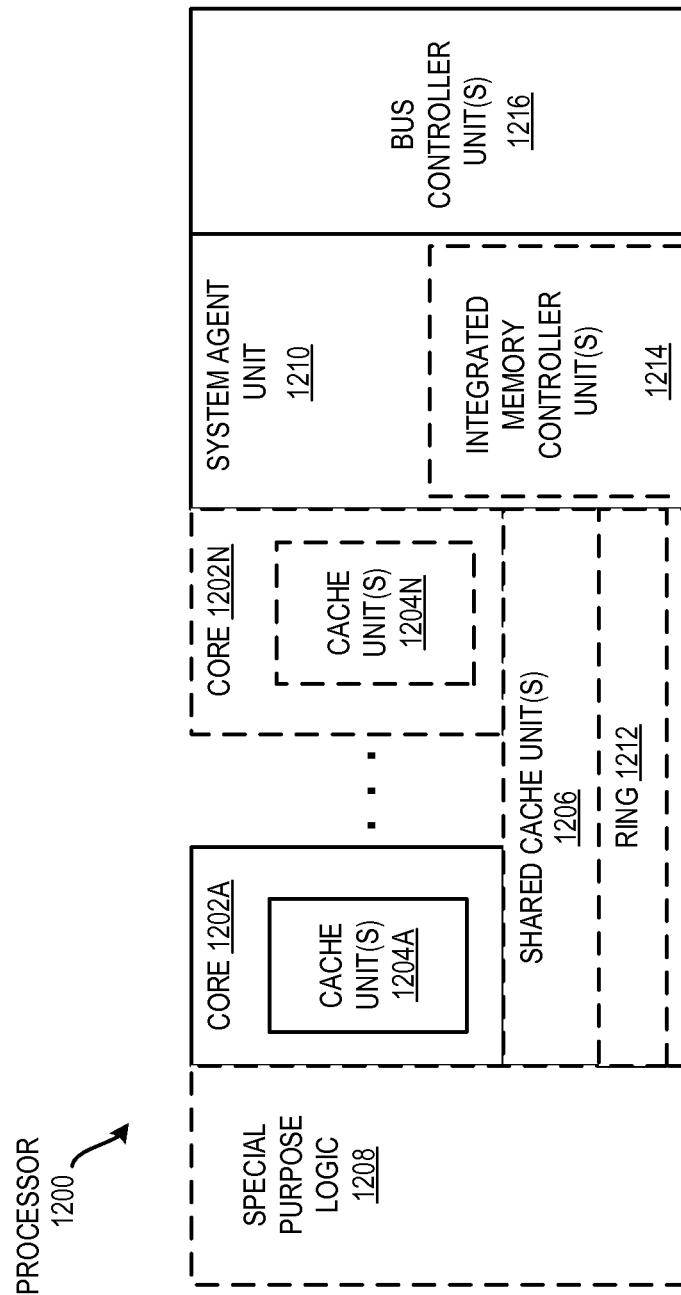
FIG. 12 is a block diagram of an embodiment of a processor that may have more than one core, may have an integrated memory controller, and may have integrated graphics.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
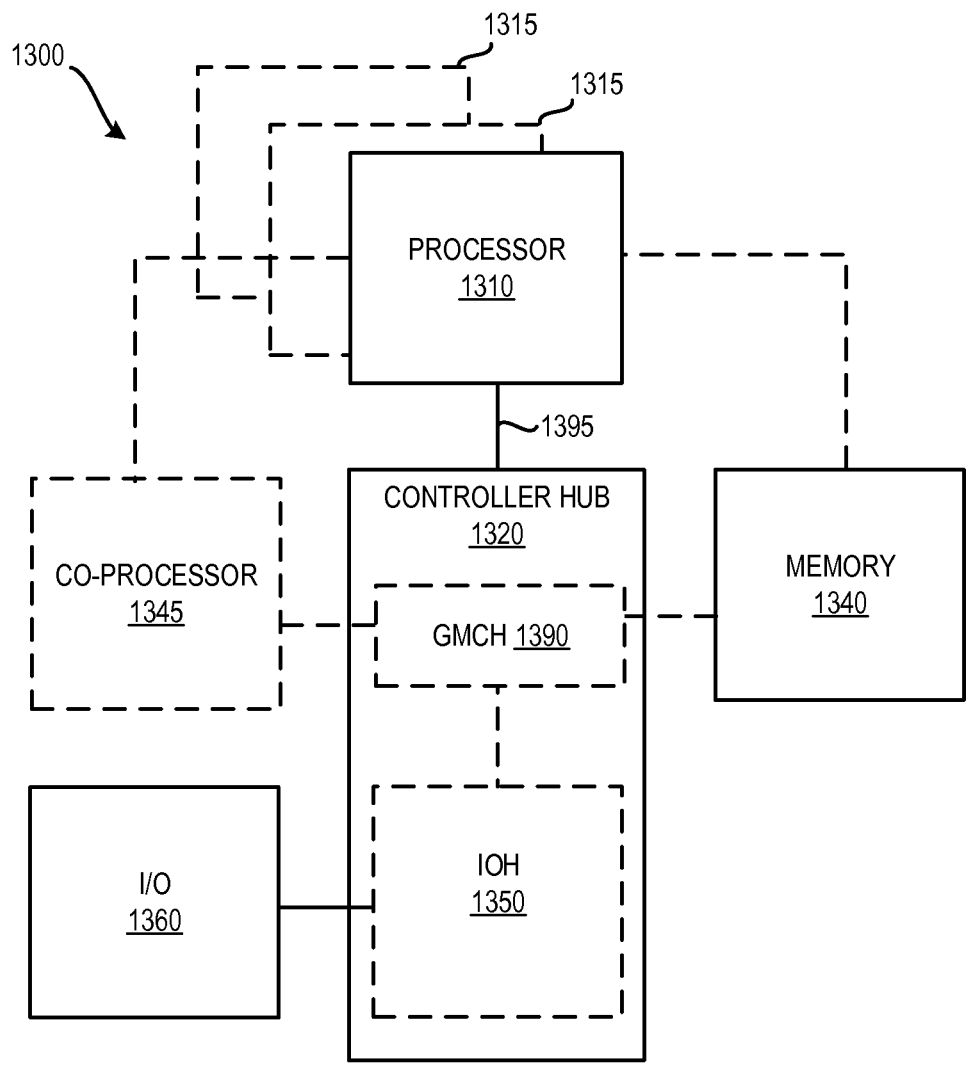
FIG. 13 is a block diagram of a first embodiment of a computer architecture.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
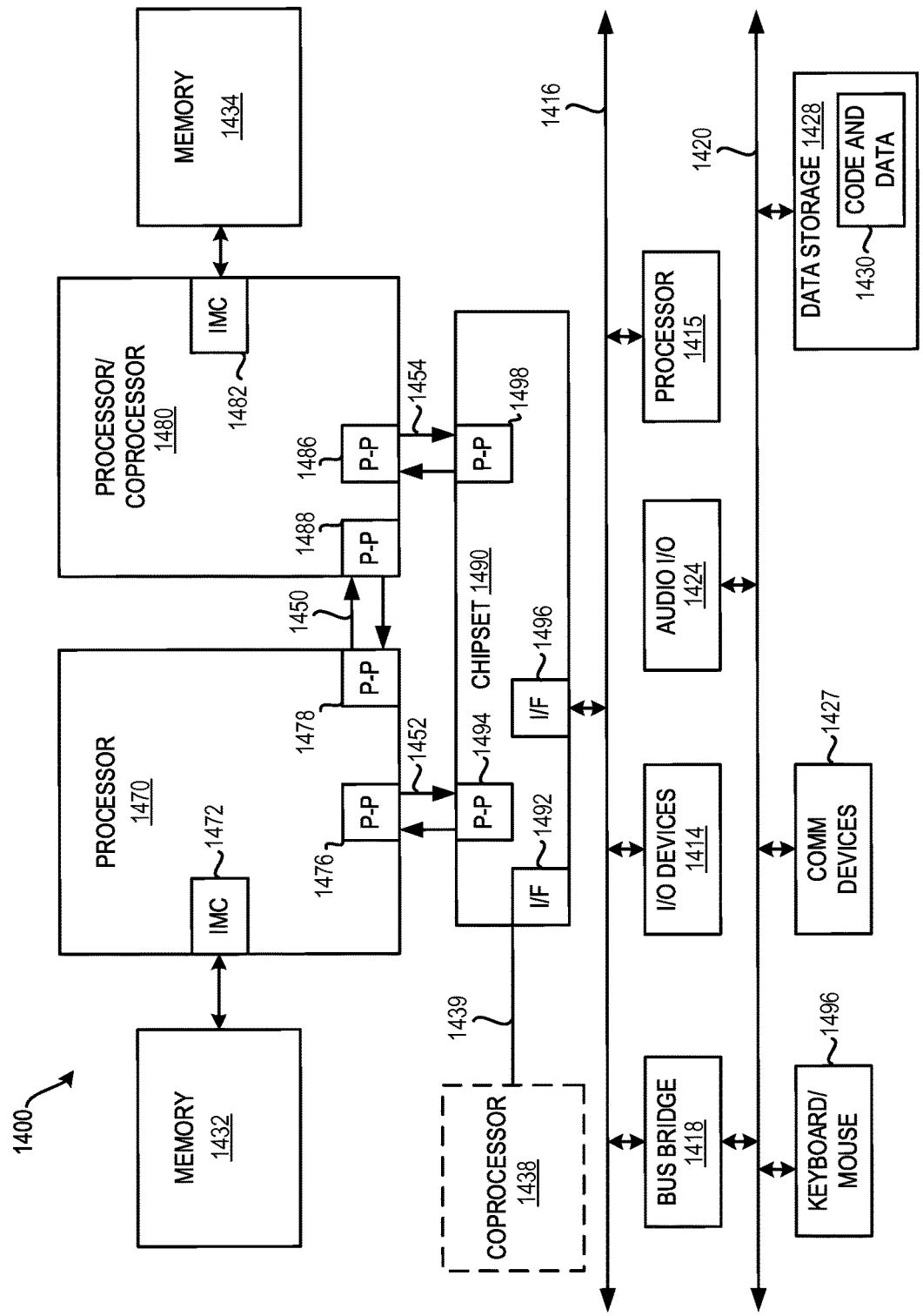
FIG. 14 is a block diagram of a second embodiment of a computer architecture.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
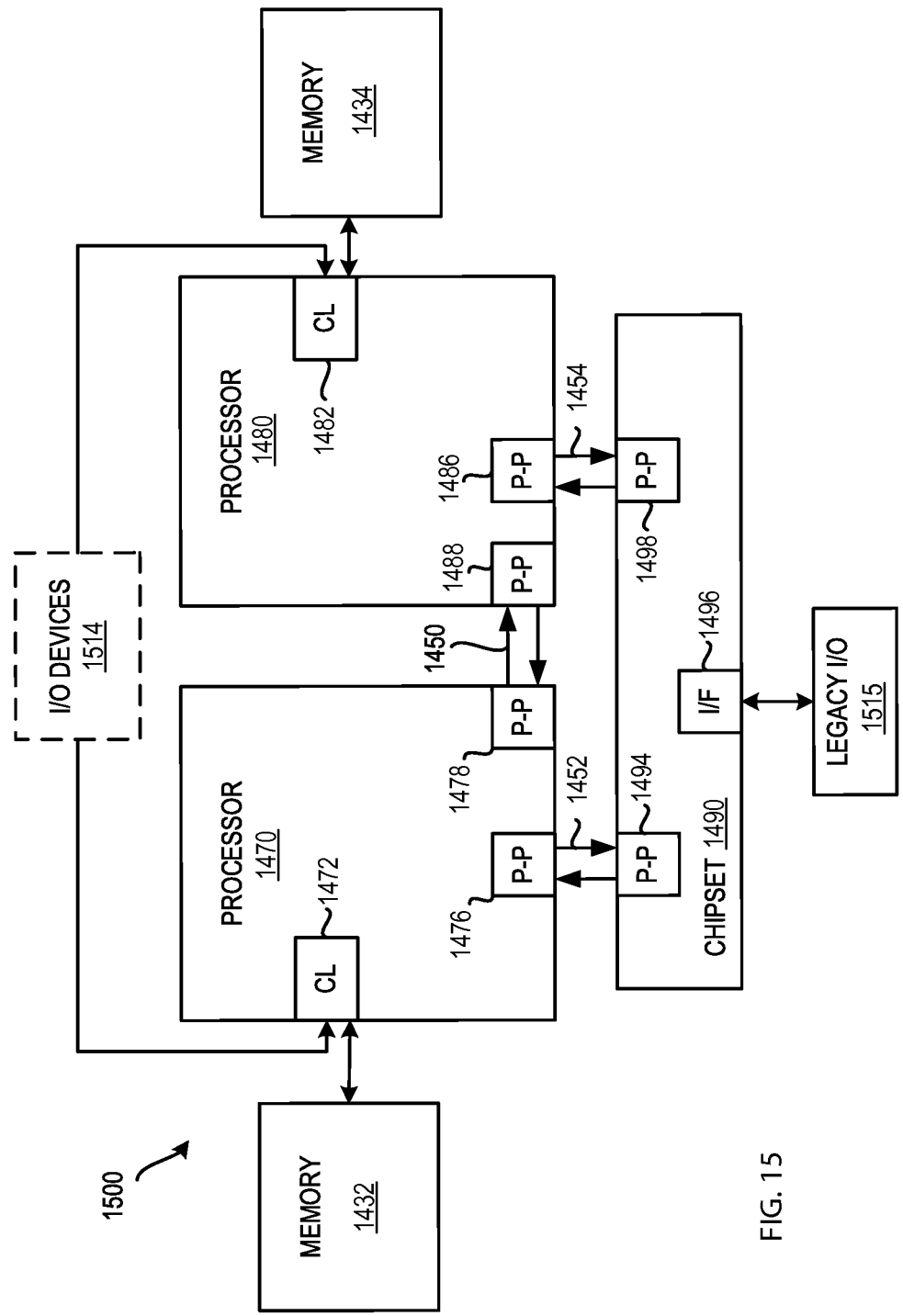
FIG. 15 is a block diagram of a third embodiment of a computer architecture.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
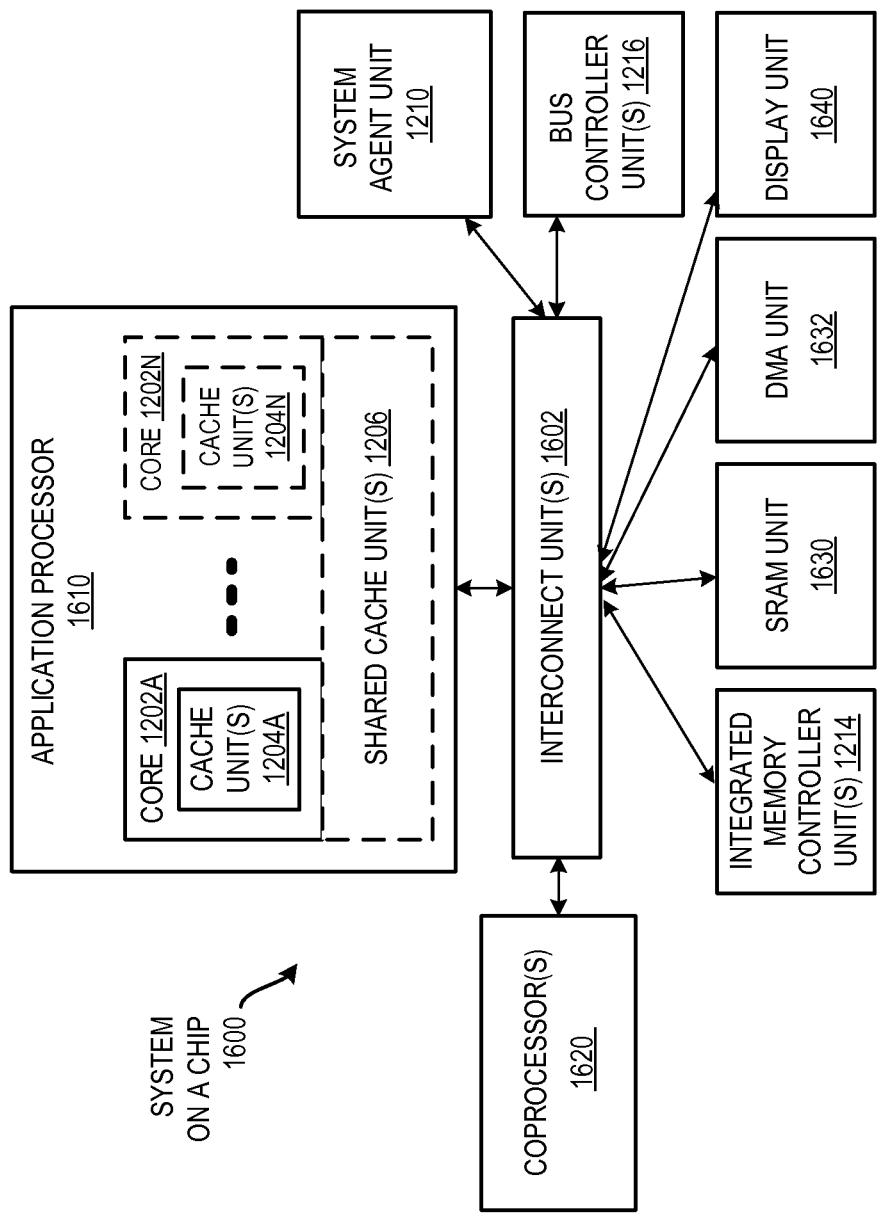
FIG. 16 is a block diagram of a fourth embodiment of a computer architecture.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 152A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
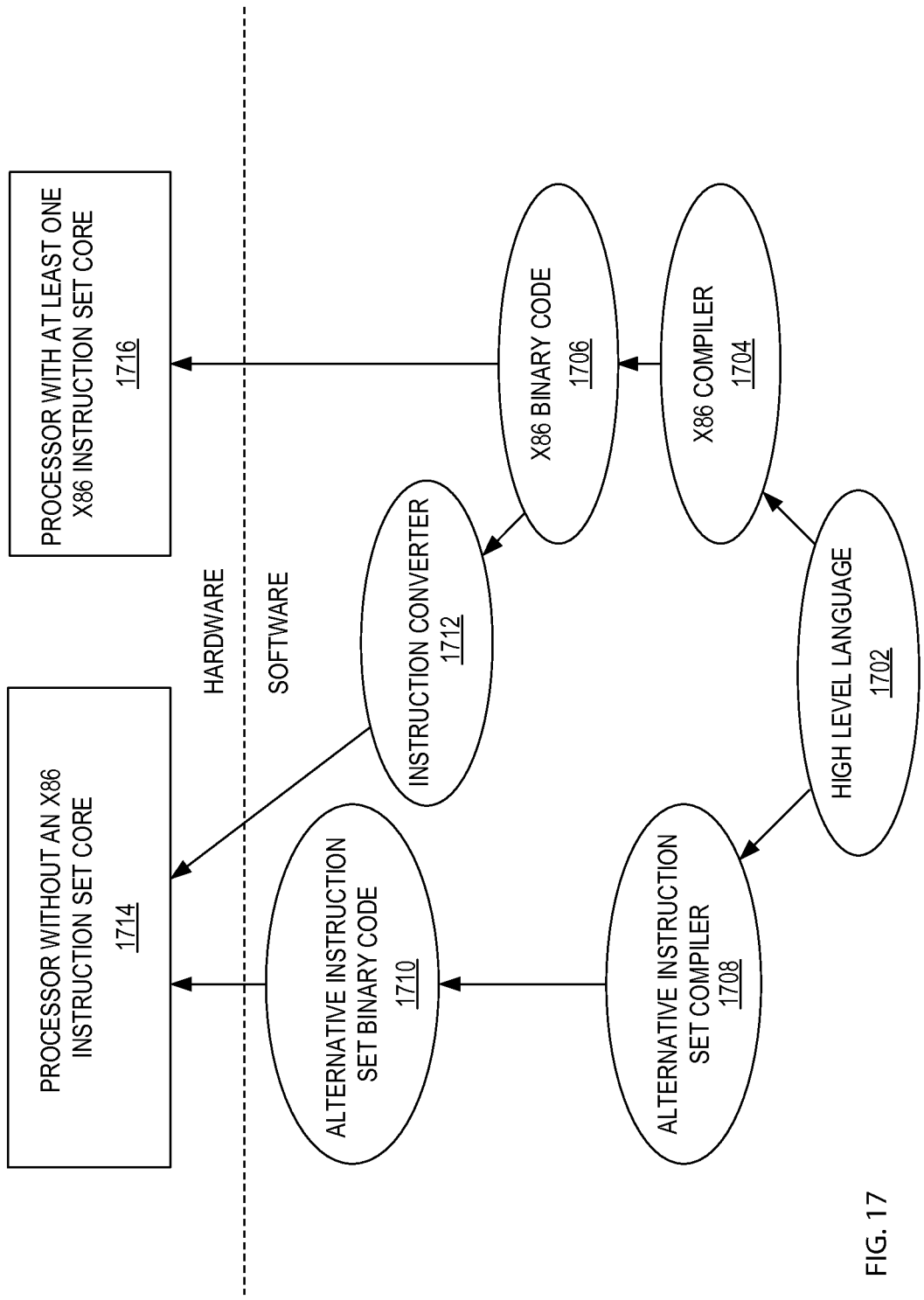
FIG. 17 is a block diagram of use of a software instruction converter to convert binary instructions in a source instruction set to binary instructions in a target instruction set, according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Components, features, and details described for any of FIGS. 2 and 5-7 may also optionally apply to any of FIG. 4. Moreover, components, features, and details described for any of the apparatus may also optionally apply to any of the methods, which in embodiments may be performed by and/or with such apparatus. Any of the processors described herein may be included in any of the computer systems disclosed herein (e.g., FIGS. 13-16). In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor that includes at least one memory controller, and a decode unit to decode a persistent commit demarcate instruction. The persistent commit demarcate instruction is to indicate a destination storage location. The processor also includes an execution unit coupled with the decode unit and the at least one memory controller. The execution unit, in response to the persistent commit demarcate instruction, is to store a demarcation value in the destination storage location. The demarcation value is to demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed.

Example 2 includes the processor of Example 1, in which at least one of said at least all first store to persistent memory operations is to be addressed to a persistent memory at one of a byte granularity and a cacheline granularity that corresponds to a cacheline of the processor.

Example 3 includes the processor of Example 1, further including a plurality of general-purpose registers, and in which the persistent commit demarcate instruction is to indicate the destination storage location in one of the general-purpose registers.

Example 4 includes the processor of Example 1, in which the processor, in response to the persistent commit demarcate instruction, is not to prevent said at least all second store to persistent memory operations from being stored persistently before said at least all first store to persistent memory operations are stored persistently.

Example 5 includes the processor of Example 1, in which the execution unit, in response to the persistent commit demarcate instruction, is to store the demarcation value that is to demarcate said at least all first store to persistent memory operations that are to have been received at the at least one memory controller at times before the persistent commit demarcate instruction is performed from said at least all second store to persistent memory operations that are to be received at the at least one memory controller at times after the persistent commit demarcate instruction is performed.

Example 6 includes the processor of Example 1, further including a monotonically increasing value generator to generate monotonically increasing values for store to memory operations as they arrive at a first memory controller of the at least one memory controller. The execution unit, in response to the persistent commit demarcate instruction, is to store a monotonically increasing value that is to have been generated for a store to memory operation that is to have arrived at the first memory controller most recently before the persistent commit demarcate is performed.

Example 7 includes the processor of Example 6, in which the monotonically increasing value generator includes an arrival counter.

Example 8 includes the processor of Example 6, in which the monotonically increasing value generator includes one of a timer and a clock.

Example 9 includes the processor of Example 1, in which the at least one memory controller includes a plurality of memory controllers. The processor also optionally includes at least one monotonically increasing value generator that is to generate monotonically increasing and mutually consistent values for store to memory operations as they arrive at each of the plurality of memory controllers.

Example 10 includes the processor of Example 1, in which the at least one memory controller includes a plurality of memory controllers. The execution unit, in response to the persistent commit demarcate instruction, is optionally to store the demarcation value that is to demarcate said at least all first store to persistent memory operations which are to be within domains of the plurality of memory controllers from said at least all second store to persistent memory operations which are also to be within the domains of the plurality of memory controllers.

Example 11 includes the processor of Example 1, in which the execution unit, in response to the persistent commit demarcate instruction, is to store the demarcation value that is to demarcate said at least all first store to persistent memory operations which are to be within only a domain of a single memory controller from said at least all second store to persistent memory operations which are also to be within only the domain of the single memory controller.

Example 12 includes the processor of any one of Examples 1 to 11, in which the decode unit is to decode a persistent commit block instruction. The persistent commit block instruction is to indicate a source storage location that is to store the demarcation value. The processor, in response to the persistent commit block instruction, is to ensure that said at least all first store to persistent memory operations have been stored persistently, before at least any store to persistent memory instructions are executed after execution of the persistent commit block instruction.

Example 13 includes the processor of Example 12, further including a plurality of registers. The persistent commit demarcate instruction is to implicitly indicate a given register of the plurality of registers as the destination storage location. The persistent commit block instruction is optionally to implicitly indicate the given register as the source storage location.

Example 14 includes the processor of Example 12, in which the processor, in response to the persistent commit block instruction, is to suspend execution of said at least any store to persistent memory instructions that are to be executed after execution of the persistent commit block instruction until said at least all first store to persistent memory operations have been stored persistently.

Example 15 includes the processor of Example 12, in which the processor, in response to the persistent commit block instruction, is to ensure that said at least all first store to persistent memory operations have been stored persistently, before said any store to persistent memory instructions are executed after the execution of the persistent commit block instruction, but not necessarily before any store to non-persistent memory instructions are executed after the execution of the persistent commit block instruction.

Example 16 includes the processor of Example 12, in which the processor, in response to the persistent commit block instruction, is to ensure that said at least all first store to persistent memory operations have been stored persistently, before said any store to persistent memory instructions are executed after the execution of the persistent commit block instruction, and before any store to non-persistent memory instructions are executed after the execution of the persistent commit block instruction.

Example 17 includes the processor of Example 12, in which the processor, in response to the persistent commit block instruction, is to compare the demarcation value with values obtained from departing store to memory operations when they depart from the at least one memory controller.

Example 18 includes the processor of any one of Examples 1 to 11, in which the decode unit is to decode a persistent commit check instruction. The persistent commit check instruction is to indicate a destination storage location. The processor, in response to the persistent commit check instruction, is to store a value in the destination storage location indicated by the persistent commit check instruction that is to indicate whether said at least all first store to persistent memory operations have been stored persistently.

Example 19 includes the processor of Example 18, in which the persistent commit check instruction to indicate a source storage location that is to have the demarcation value.

Example 20 includes the processor of Example 18, in which the processor, in response to the persistent commit check instruction, is to store the value in the destination storage location indicated by the persistent commit check instruction that is to indicate a level of progress of persistently storing said at least all first store to persistent memory operations.

Example 21 is a method in a processor that includes receiving a persistent commit demarcate instruction. The persistent commit demarcate instruction indicates a destination storage location. The method also includes storing a demarcation value in the destination storage location in response to the persistent commit demarcate instruction. The demarcation value is to demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed.

Example 22 includes the method of Example 21, further including receiving a persistent commit block instruction. The persistent commit block instruction indicating a source storage location storing the demarcation value. The method also includes ensuring that said at least all first store to persistent memory operations have been stored persistently, before at least any store to persistent memory instructions are executed after execution of the persistent commit block instruction, in response to the persistent commit block instruction.

Example 23 includes the method of Example 21, further including receiving a persistent commit check instruction. The persistent commit check instruction indicating a destination storage location. The method also includes storing a value in the destination storage location indicated by the persistent commit check instruction in response to the persistent commit check instruction. The value to be stored responsive to the persistent commit check instruction is to indicate whether said at least all first store to persistent memory operations have been stored persistently.

Example 24 is a system to process instructions including an interconnect, and a processor coupled with the interconnect. The processor is to receive a persistent commit demarcate instruction. The persistent commit demarcate instruction is to indicate a destination storage location. The processor, in response to the persistent commit demarcate instruction, is to store a demarcation value in the destination storage location. The demarcation value is to demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed. The system also includes a dynamic random access memory (DRAM) coupled with the interconnect. The DRAM stores a set of instructions, the set of instructions, when executed by the processor, to cause the processor to perform operations including: (1) determining non-dependent work to perform which does not depend upon said at least all first store to persistent memory operations; and (2) performing the work after performing the persistent commit demarcate instruction.

Example 25 includes the system of Example 24, in which the processor is to receive a persistent commit block instruction. The persistent commit block instruction to indicate a source storage location that is to store the demarcation value. The processor, in response to the persistent commit block instruction, is to ensure that said at least all first store to persistent memory operations have been stored persistently, before at least any store to persistent memory instructions are executed after execution of the persistent commit block instruction.

Example 26 is an article of manufacture including a non-transitory machine-readable storage medium. The non-transitory machine-readable storage medium stores a persistent commit demarcate instruction. The persistent commit demarcate instruction is to indicate a destination storage location. The persistent commit demarcate instruction if executed by a machine is to cause the machine to perform operations including store a demarcation value in the destination storage location. The demarcation value is to demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed.

Example 27 includes the article of manufacture of Example 26, in which the non-transitory machine-readable storage medium also stores a persistent commit block instruction. The persistent commit block instruction is to indicate a source storage location that is to store the demarcation value. The persistent commit block instruction if executed by the machine is to cause the machine to perform operations including ensure that said at least all first store to persistent memory operations have been stored persistently, before at least any store to persistent memory instructions are executed after execution of the persistent commit block instruction.

Example 28 includes the processor of any one of Examples 1 to 20, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 29 is a processor or other apparatus to perform or operative to perform the method of any one of Examples 21 to 23.

Example 30 is a processor or other apparatus that includes means for performing the method of any one of Examples 21 to 23.

Example 31 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 21 to 23.

Example 32 is a processor or other apparatus substantially as described herein.

Example 33 is a processor or other apparatus that is operative to perform any method substantially as described herein.

Example 34 is a processor or other apparatus to perform (e.g., that has components to perform or that is operative to perform) any instruction substantially as described herein.

Example 35 is a computer system or other electronic device that includes a processor having a decode unit to decode instructions of a first instruction set. The processor also has one or more execution units. The electronic device also includes a storage device coupled with the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when performed by the processor, are to cause the processor to emulate the first instruction.

What is claimed is:
1. A processor comprising:
   at least one memory controller;
   a decode unit to decode a persistent commit demarcate instruction and a persistent commit block instruction of an instruction set of the processor, the persistent commit demarcate instruction to indicate an architecturally-visible destination register of the processor; and
   an execution unit coupled with the decode unit and coupled with the at least one memory controller, the execution unit, in response to the decode of the persistent commit demarcate instruction, to store a demarcation value in the architecturally-visible destination register, wherein the demarcation value is to demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed, the processor, in response to the decode of the persistent commit block instruction, to ensure that data of said at least all first store to persistent memory operations has been stored persistently before data of at least any store to persistent memory instructions that are to be executed after execution of the persistent commit block instruction.

2. The processor of claim 1, wherein at least one of said at least all first store to persistent memory operations is to be addressed to a persistent memory at one of a byte granularity and a cacheline granularity that corresponds to a cacheline of the processor.

3. The processor of claim 1, further comprising a plurality of general-purpose registers, and wherein the persistent commit demarcate instruction is to indicate the architecturally-visible destination register in one of the general-purpose registers.

4. The processor of claim 1, wherein the processor, in response to the decode of the persistent commit demarcate instruction, is not to prevent data of said at least all second store to persistent memory operations from being stored persistently before data of said at least all first store to persistent memory operations is stored persistently.

5. The processor of claim 1, wherein the execution unit, in response to the decode of the persistent commit demarcate instruction, is to store the demarcation value that is to demarcate said at least all first store to persistent memory operations that are to have been received at the at least one memory controller at times before the persistent commit demarcate instruction is performed from said at least all second store to persistent memory operations that are to be received at the at least one memory controller at times after the persistent commit demarcate instruction is performed.

6. The processor of claim 1, further comprising a monotonically increasing value generator to generate monotonically increasing values for store to memory operations as they arrive at a first memory controller of the at least one memory controller, and wherein the execution unit, in response to the decode of the persistent commit demarcate instruction, is to store a monotonically increasing value that is to have been generated for a store to memory operation that is to have arrived at the first memory controller most recently before the persistent commit demarcate is performed.

7. The processor of claim 6, wherein the monotonically increasing value generator comprises an arrival counter.

8. The processor of claim 6, wherein the monotonically increasing value generator comprises one of a timer and a clock.

9. The processor of claim 1, wherein the at least one memory controller comprises a plurality of memory controllers, and further comprising at least one monotonically increasing value generator that is to generate monotonically increasing values for store to memory operations as they arrive at each of the plurality of memory controllers.

10. The processor of claim 1, wherein the at least one memory controller comprises a plurality of memory controllers, and wherein the execution unit, in response to the decode of the persistent commit demarcate instruction, is to store the demarcation value that is to demarcate said at least all first store to persistent memory operations which are to access the plurality of memory controllers from said at least all second store to persistent memory operations which are also to access the plurality of memory controllers.

11. The processor of claim 1, wherein the execution unit, in response to the decode of the persistent commit demarcate instruction, is to store the demarcation value that is to demarcate said at least all first store to persistent memory operations which are to access only a single memory controller from said at least all second store to persistent memory operations which are also to access only the single memory controller.

12. The processor of claim 1, wherein the persistent commit block instruction is to indicate a source storage location that is to store the demarcation value.

13. The processor of claim 12, further comprising a plurality of registers, wherein the persistent commit demarcate instruction is to implicitly indicate a given register of the plurality of registers as the architecturally-visible destination register, and wherein the persistent commit block instruction is to implicitly indicate the given register as the source storage location.

14. The processor of claim 12, wherein the processor, in response to the decode of the persistent commit block instruction, is to suspend the execution of said at least any store to persistent memory instructions that are to be executed after execution of the persistent commit block instruction until the data of said at least all first store to persistent memory operations has been stored persistently.

15. The processor of claim 12, wherein the processor, in response to the decode of the persistent commit block instruction, is to ensure that data of said at least all first store to persistent memory operations have been stored persistently, before said any store to persistent memory instructions are executed after the execution of the persistent commit block instruction, but not necessarily before any store to non-persistent memory instructions are executed after the execution of the persistent commit block instruction.

16. The processor of claim 12, wherein the processor, in response to the decode of the persistent commit block instruction, is to ensure that said at least all first store to persistent memory operations have been stored persistently, before said any store to persistent memory instructions are executed after the execution of the persistent commit block instruction, and before any store to non-persistent memory instructions are executed after the execution of the persistent commit block instruction.

17. The processor of claim 1, wherein the decode unit is to decode a persistent commit check instruction, the persistent commit check instruction to indicate a destination storage location, and wherein the processor, in response to the decode of the persistent commit check instruction, is to store a value in the destination storage location indicated by the persistent commit check instruction that is to indicate whether said at least all first store to persistent memory operations have been stored persistently.

18. The processor of claim 17, wherein the persistent commit check instruction is to indicate a source storage location that is to have the demarcation value.

19. A method in a processor comprising:
receiving a persistent commit demarcate instruction and a persistent commit block instruction of an instruction set of the processor, the persistent commit demarcate instruction indicating an architecturally-visible destination register of the processor; and
storing a demarcation value in the architecturally-visible destination register in response to a decode of the persistent commit demarcate instruction, wherein the demarcation value is to demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed; and performing the persistent commit block instruction, of the instruction set of the processor, to read the demarcation value that is stored in the architecturally-visible destination register, and to ensure that data of said at least all first store to persistent memory operations has been stored persistently before data of at least any store to persistent memory instructions that are to be executed after execution of the persistent commit block instruction.

20. The method of claim 19,
wherein the second instruction is a persistent commit block instruction that indicates a source storage location storing the demarcation value.

21. The method of claim 19, further comprising:
receiving a persistent commit check instruction, the persistent commit check instruction indicating a destination storage location; and
storing a value in the destination storage location indicated by the persistent commit check instruction in response to a decode of the persistent commit check instruction, wherein the value to be stored responsive to the persistent commit check instruction is to indicate whether said at least all first store to persistent memory operations have been stored persistently.

22. A system to process instructions comprising:
an interconnect;
a processor coupled with the interconnect, the processor comprising a plurality of registers, the processor to receive a persistent commit demarcate instruction and a persistent commit block instruction of an instruction set of the processor, the persistent commit demarcate instruction to have a field to specify a destination register of the plurality of registers, the processor, in response to the persistent commit demarcate instruction, to store a demarcation value in the destination register that is to be specified by the field of the persistent commit demarcate instruction, wherein the demarcation value is to demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed, the processor, in response to the persistent commit block instruction, to ensure that data of said at least all first store to persistent memory operations has been stored persistently before data of at least any store to persistent memory instructions that are to be executed after execution of the persistent commit block instruction; and
a dynamic random access memory (DRAM) coupled with the interconnect, the DRAM storing a set of instructions, the set of instructions, when executed by the processor, to cause the processor to perform operations comprising:
determining non-dependent work to perform which does not depend upon said at least all first store to persistent memory operations; and
performing the work after performing the persistent commit demarcate instruction.

23. The system of claim 22, wherein the persistent commit block instruction is to indicate a source storage location that is to store the demarcation value.

24. An article of manufacture comprising a non-transitory machine-readable storage medium, the non-transitory machine-readable storage medium storing a persistent commit demarcate instruction and a persistent commit block instruction of an instruction set of a processor, the persistent commit demarcate instruction to indicate an architecturally-visible destination register, the persistent commit demarcate instruction if executed by a machine is to cause the machine to perform operations comprising to store a demarcation value in the architecturally-visible destination register, wherein the demarcation value is to demarcate at least all first store to persistent memory operations that are to have been accepted to memory when the persistent commit demarcate instruction is performed, but which are not necessarily to have been stored persistently, from at least all second store to persistent memory operations that are not yet to have been accepted to memory when the persistent commit demarcate instruction is performed, the persistent commit block instruction if executed by the machine is to cause the machine to perform operations comprising to ensure that data of said at least all first store to persistent memory operations has been stored persistently before data of at least any store to persistent memory instructions that are to be executed after execution of the persistent commit block instruction.

25. The article of manufacture of claim 24, wherein the non-transitory machine-readable storage medium also stores a persistent commit block instruction, the persistent commit block instruction to indicate a source storage location that is to store the demarcation value, the persistent commit block instruction if executed by the machine is to cause the machine to perform operations comprising:
ensure that said at least all first store to persistent memory operations have been stored persistently, before at least any store to persistent memory instructions are executed after execution of the persistent commit block instruction.

26. A processor comprising:
at least one memory controller;
a plurality of registers that are to be specified by instructions of an instruction set of the processor;
a decode unit to decode a first instruction and a second instruction of the instruction set, the first instruction to indicate a destination register of the plurality of registers; and
an execution unit coupled with the decode unit and coupled with the at least one memory controller, the execution unit, in response to the decode of the first instruction, to store a demarcation value in the destination register, wherein the demarcation value is to demarcate at least all first store to persistent memory operations that are to have been accepted to memory when the first instruction is performed, but which are not necessarily to have been stored persistently, from at least all second store to persistent memory operations that are not yet to have been accepted to memory when the first instruction is performed,
wherein at least one of said at least all first store to persistent memory operations is to be addressed to a persistent memory at a byte granularity, and
wherein the processor, in response to the decode of the first instruction, is not to make a guarantee pertaining to the persistent storage of data of said at least all first store to persistent memory operations, but the processor, in response to the decode of the second instruction is to make a guarantee pertaining to the persistent storage of the data of said at least all first store to persistent memory operations.

27. The processor of claim 26, wherein the second instruction is to indicate a source storage location that is to store the demarcation value.

\* \* \* \* \*